US012069985B2

United States Patent
Yamamoto et al.

(10) Patent No.: US 12,069,985 B2
(45) Date of Patent: Aug. 27, 2024

(54) WORK UNIT WITH AN AUXILIARY PLATE

(71) Applicant: Kubota Corporation, Osaka (JP)

(72) Inventors: Tomohisa Yamamoto, Sakai (JP); Tatsuro Tokunaga, Sakai (JP); Ryo Matsumoto, Sakai (JP); Akihito Mihara, Sakai (JP); Ryusuke Kawamoto, Sakai (JP); Terumasa Kobayashi, Sakai (JP); Hiroki Nagai, Sakai (JP); Toshiki Kanai, Sakai (JP); Ryotaro Nakatsu, Sakai (JP); Yuto Akai, Sakai (JP); Seiya Sato, Sakai (JP); Nobuyuki Yamashita, Sakai (JP)

(73) Assignee: Kubota Corporation, Osaka (JP)

( * ) Notice: Subject to any disclaimer, the term of this patent is extended or adjusted under 35 U.S.C. 154(b) by 911 days.

(21) Appl. No.: 16/677,318

(22) Filed: Nov. 7, 2019

(65) Prior Publication Data
US 2020/0178461 A1 Jun. 11, 2020

(30) Foreign Application Priority Data

Dec. 6, 2018 (JP) .................................. 2018-229387
Feb. 21, 2019 (JP) .................................. 2019-029778
(Continued)

(51) Int. Cl.
A01D 34/81 (2006.01)
A01D 34/24 (2006.01)
(Continued)

(52) U.S. Cl.
CPC ............. *A01D 34/81* (2013.01); *A01D 34/24* (2013.01); *A01D 34/661* (2013.01); *A01D 2101/00* (2013.01)

(58) Field of Classification Search
CPC .... A01D 75/185; A01D 34/00; A01D 34/001; A01D 34/62; A01D 34/63; A01D 34/64;
(Continued)

(56) References Cited

U.S. PATENT DOCUMENTS 7,685,800 B2 * 3/2010 Sugio ..................... A01D 34/64
56/320.1
7,877,972 B2 * 2/2011 Fox ........................ A01D 34/64
56/15.6
(Continued)

FOREIGN PATENT DOCUMENTS

JP 6253639 A 9/1994
JP 2014207922 A 11/2014
(Continued)

Primary Examiner — Adam J Behrens
(74) Attorney, Agent, or Firm — The Webb Law Firm

(57) ABSTRACT

A work unit to be attached to a lower side of a work vehicle that includes a wheel includes a work portion, a housing that covers the work portion, a bridge portion that is provided above the housing, auxiliary plates that change their positions between a state of being housed in the bridge portion and a state of protruding from the bridge portion, a linkage mechanism that is provided in the bridge portion and is connected to the auxiliary plates, and an operation tool for operating the linkage mechanism. As a result of operating the operation tool, the linkage mechanism is folded or unfolded, and positions of the auxiliary plates are changed between the state of being housed in the bridge portion and the state of protruding from the bridge portion.

7 Claims, 13 Drawing Sheets

(30) Foreign Application Priority Data

Feb. 21, 2019 (JP) .................................. 2019-029779
Feb. 21, 2019 (JP) .................................. 2019-029780

(51) Int. Cl.
*A01D 34/66* (2006.01)
*A01D 101/00* (2006.01)

(58) Field of Classification Search
CPC ........ A01D 34/66; A01D 34/82; A01D 34/81;
A01D 34/661; A01D 67/00; A01D 67/005
See application file for complete search history.

(56) References Cited

U.S. PATENT DOCUMENTS

| | | | |
|---|---|---|---|
| 8,234,847 B2* | 8/2012 | Fox | A01D 34/64 |
| | | | 56/15.6 |
| 9,699,962 B2* | 7/2017 | Akita | A01D 34/81 |
| 10,480,156 B2* | 11/2019 | Nagai | E02F 9/0875 |
| 11,178,816 B2* | 11/2021 | Anderson | A01D 34/81 |
| 2007/0028577 A1* | 2/2007 | Clement | A01D 34/64 |
| | | | 56/17.2 |
| 2009/0301050 A1 | 12/2009 | Kohler | |
| 2015/0181803 A1* | 7/2015 | Tada | A01D 34/661 |
| | | | 56/320.1 |
| 2017/0167112 A1* | 6/2017 | Nagai | E02F 3/3417 |

FOREIGN PATENT DOCUMENTS

| | | |
|---|---|---|
| JP | 20158665 A | 1/2015 |
| JP | 201634257 A | 3/2016 |
| JP | 2016123315 A | 7/2016 |

* cited by examiner

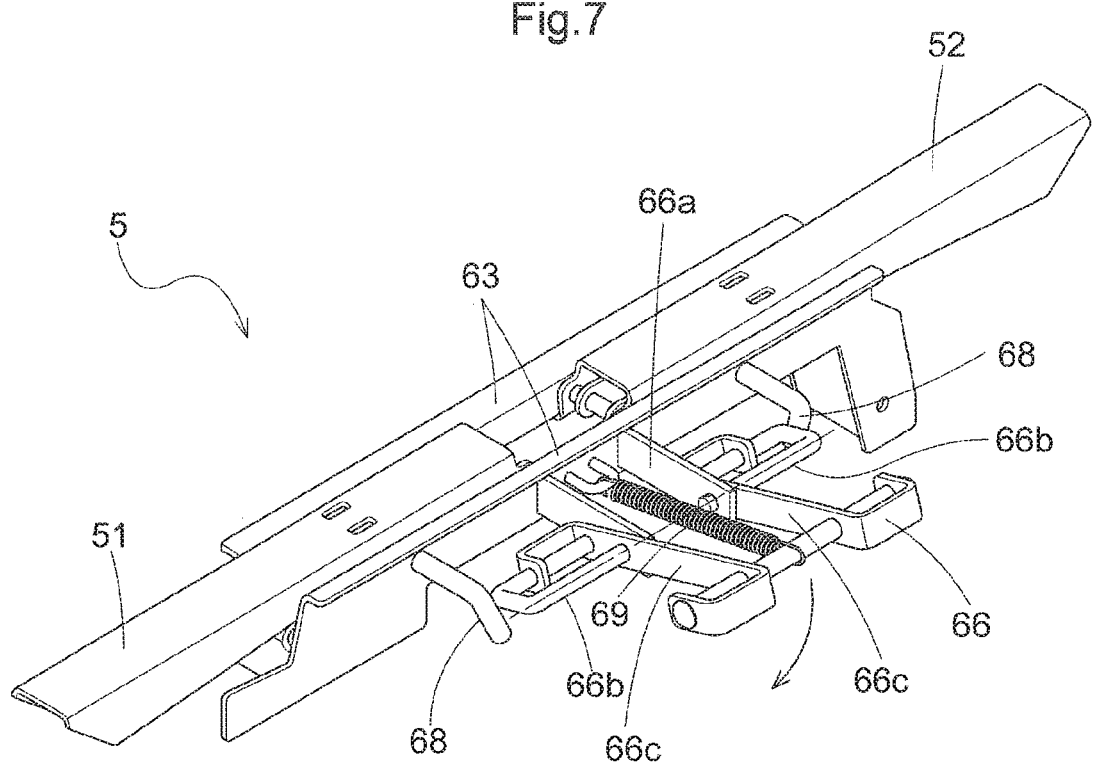
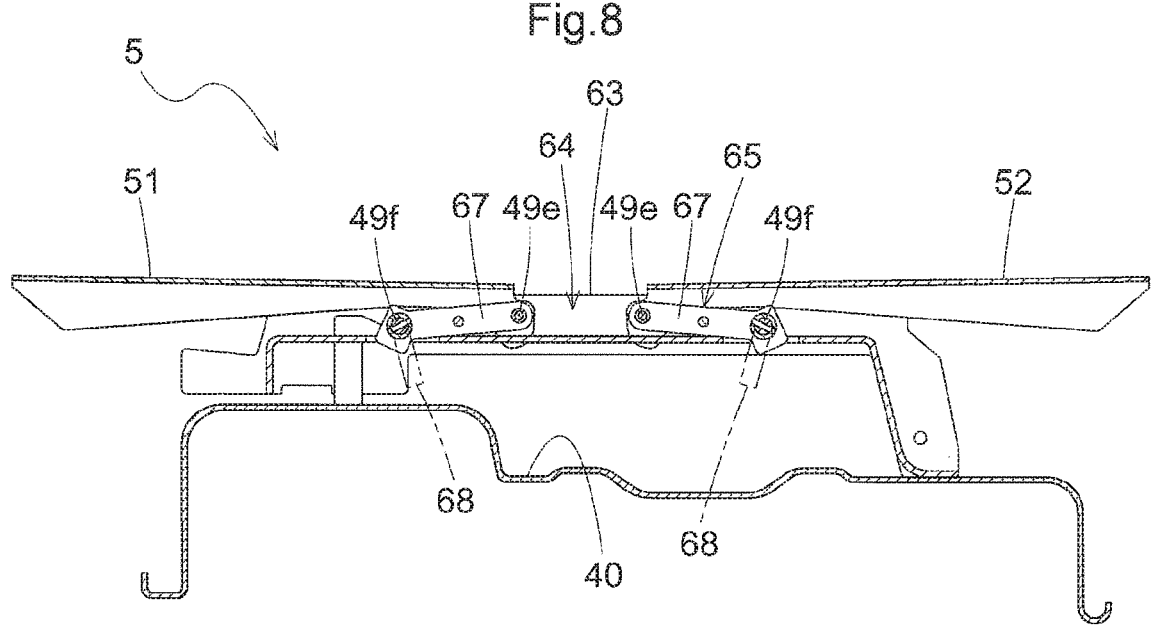

WORK UNIT WITH AN AUXILIARY PLATE

CROSS-REFERENCE TO RELATED APPLICATIONS

This application claims priority to Japanese Patent Application No. 2018-229387 filed Dec. 6, 2018, and Japanese Patent Application Nos. 2019-029778, 2019-029779, and 2019-029780, filed Feb. 21, 2019, the disclosures of which are hereby incorporated by reference in their entirety.

BACKGROUND OF THE INVENTION

1. Field of the Invention

The present invention relates to a work unit that is installed between a front wheel and a rear wheel on a lower side of a mid-mount work vehicle.

2. Description of the Related Art

As disclosed in JP 2016-34257A, a mid-mount work vehicle includes a detachable work unit. The work unit is suspended during a work operation so as to be movable up and down between a front wheel and a rear wheel of the vehicle body. The work unit is removed from the vehicle body when maintenance, inspection, or the like is performed on the work unit. It is hard work for a worker to couple the work unit to the vehicle body or detach the work unit from the vehicle body in a narrow space between the front wheel and the rear wheel of the vehicle body. Therefore, some work units are configured to include a climb-over mechanism. The work unit is arranged on the lower side of the mid-mount work vehicle as a result of a front wheel or a rear wheel of the mid-mount work vehicle traveling over the climb-over mechanism of the work unit. The climb-over mechanism is constituted by a bridge portion that is provided in an upper portion of the work unit and two auxiliary plates. The auxiliary plates are housed in the bridge portion during a work operation of the work unit. When the mid-mount work vehicle travels over the work unit, the auxiliary plates are suspended so as to connect the bridge portion and the ground in the front-rear direction of the bridge portion. As a result of a wheel of the mid-mount work vehicle traveling on one of the auxiliary plates, the bridge portion, and the other auxiliary plate in this order, the work unit is arranged between the front wheel and the rear wheel with the mid-mount work vehicle straddling the work unit.

SUMMARY OF THE INVENTION

However, in a conventional climb-over mechanism of the work units, the two auxiliary plates housed in the bridge portion are fixed to the bridge portion using pins. Therefore, when the climb-over mechanism is to be used, the pins need to be removed and the auxiliary plates need to be manually extracted from the bridge portion, and therefore operability is poor.

In order to solve the above-described problem, a first object of the present invention is to improve operability of the climb-over mechanism.

Further, if a large amount of pressure is applied to the auxiliary plates of the climb-over mechanism when the mid-mount work vehicle travels over the climb-over mechanism of the work unit, the auxiliary plates or the main body of the climb-over mechanism may be deformed or damaged.

As a result, the auxiliary plates may be unable to be housed and cause a problem in operation of the work unit.

A second object of the present invention is to suppress deformation and damage of the main body and the auxiliary plates of the climb-over mechanism.

Further, the auxiliary plates housed in the bridge portion may protrude while the mid-mount work vehicle equipped with the work unit is performing a work operation. If the auxiliary plates protrude during a work operation, the work operation may be hindered or the auxiliary plates or the mid-mount work vehicle may be damaged.

A third object of the present invention is to keep the auxiliary plates from protruding from the bridge portion during a work operation.

Further, in the climb-over mechanism of conventional work units, there is a gap between the bridge portion and the auxiliary plates. If there is a gap between the bridge portion and the auxiliary plates, grass or soil may enter the climb-over mechanism via the gap when the mid-mount work vehicle is traveling over the climb-over mechanism of the work unit or the work unit is performing a work operation. If grass or soil enters the climb-over mechanism via the gap, the climb-over mechanism may cease to operate properly.

A fourth object of the present invention is to suppress the intrusion of grass or soil into the climb-over mechanism.

In order to achieve the above-described first object, a work unit according to one embodiment of the present invention is a work unit to be attached to a lower side of a work vehicle that includes a wheel, the work unit including a work portion, a housing that covers the work portion, a bridge portion that is provided above the housing, an auxiliary plate that changes its position between a state of being housed in the bridge portion and a state of protruding from the bridge portion, a linkage mechanism that is provided in the bridge portion and is connected to the auxiliary plate, and an operation tool for operating the linkage mechanism, wherein, as a result of operating the operation tool, the linkage mechanism is folded or unfolded, and the position of the auxiliary plate is changed between the state of being housed in the bridge portion and the state of protruding from the bridge portion.

With this configuration, as a result of merely operating the operation tool, the linkage mechanism is folded or unfolded and the position of the auxiliary plate supported by the linkage mechanism is changed between a housed state and a protruding state (usage state). The position of the auxiliary plate can be easily changed by merely operating the operation tool, and therefore operability is improved.

A configuration is also possible in which the operation tool reciprocates and the linkage mechanism is folded or unfolded as the operation tool reciprocates.

With this configuration, the linkage mechanism can be folded or unfolded by making a simple operation to the operation tool, and therefore the position of the auxiliary plate can be more easily changed and operability is improved.

It is preferable that the work unit includes an elastic body that is connected to the bridge portion and an end region of the operation tool that is located opposite to the bridge portion, and when the operation tool reciprocates between one end and another end, if the operation tool is located at the one end, the elastic body biases the operation tool toward the one end, and if the operation tool is located at the other end, the elastic body biases the operation tool toward the other end.

With this configuration, the state of the operation tool is maintained by the elastic body after the operation tool reciprocates, and therefore the auxiliary plate can be kept from accidentally operating as a result of the operation tool being operated unintentionally.

Further, a work unit according to another embodiment of the present invention is a work unit to be attached to a lower side of a work vehicle that includes a wheel, the work unit including a work portion, a housing that covers the work portion, a bridge portion that is provided above the housing, a support portion that is connected to an end portion of the bridge portion and extends downward in a direction away from the bridge portion, an auxiliary plate that is linked to the support portion and changes its position under its own weight in a direction extending from the support portion, and a pin that passes through the auxiliary plate and the support portion to keep the auxiliary plate in a state of being housed in the support portion.

With this configuration, the auxiliary plate can be kept in the housed state using the pin and can be caused to protrude and enter the usage state by merely removing the pin. Thus, the position of the auxiliary plate can be easily changed and operability is improved.

It is preferable that the bridge portion spans from a front end region to a rear end region of the housing in a front-rear direction along a longitudinal direction of the auxiliary plate, and a front auxiliary plate and a rear auxiliary plate that are arranged in the front-rear direction and change their positions in opposite directions from each other are provided as a pair of the auxiliary plates in the bridge portion.

With this configuration, the auxiliary plates can be provided to protrude at least forward and rearward with respect to the work unit in order that the work vehicle can climb over the work unit. Therefore, the work vehicle can properly climb over the work unit.

It is preferable that a plurality of the bridge portions that each include the auxiliary plate are provided side by side in a left-right direction that intersects a longitudinal direction of the auxiliary plate.

With this configuration, bridge portions can be provided according to the arrangement and the number of wheels of the work vehicle, and therefore the work vehicle can properly climb over the work unit.

The work portion may be a mowing blade and the work vehicle may be a mower.

With this configuration, the work unit can be used not only in a mower but also in various work vehicles.

In order to achieve the above-described second object, a work unit according to another embodiment of the present invention is a work unit to be attached to a lower side of a work vehicle that includes a wheel, the work unit including a work portion, a housing that covers the work portion, a bridge portion that is provided above the housing, an auxiliary plate that changes its position between a housed state of being housed in the bridge portion and a usage state of protruding from the bridge portion, a linkage mechanism that is provided in the bridge portion and is configured to change the position of the auxiliary plate, an engaged portion that is provided in the auxiliary plate, and an engaging portion that is provided in the linkage mechanism and is detachably connected to the engaged portion under a predetermined elastic force.

In a configuration in which the engaging portion is connected to the engaged portion under a predetermined elastic force as described above, even if a large external force is applied to the auxiliary plate, the external force escapes as a result of the engaging portion and the engaged portion separating from each other. Therefore, the auxiliary plate, the linkage mechanism, and the like are kept from being deformed or damaged, and the work unit can be stably attached and detached. Furthermore, the auxiliary plate is engaged with the linkage mechanism using only the predetermined elastic force, and therefore the auxiliary plate can be easily attached or detached and maintenance of the linkage mechanism or the like can be easily performed. For the above reasons, a work operation can be stably performed on the work unit.

A configuration is also possible in which the engaged portion is a pin, the engaging portion is a U-shaped member that has a U-shape in a cross section, and the pin and the U-shaped member are detachably connected to each other with the pin held in the U-shaped member.

With this configuration, the pin can be held using an elastic force of the U-shaped member, and thus the U-shaped member can be engaged with the pin with a simple configuration that allows the U-shaped member to be easily attached to or detached from the pin.

It is preferable that the U-shaped member is made of spring steel.

With this configuration, it is easy to impart the U-shaped member that serves as the engaging portion with an elastic force.

It is preferable that the work unit includes a pair of the auxiliary plates that protrude toward opposite sides from each other in a front-rear direction that is a longitudinal direction of the bridge portion.

With this configuration, the auxiliary plates can be provided to protrude at least forward and rearward with respect to the work unit in order that the work vehicle can climb over the work unit. Therefore, the work vehicle can properly climb over the work unit.

It is preferable that a plurality of the bridge portions that each include the auxiliary plate are provided side by side in a left-right direction that intersects a longitudinal direction of the auxiliary plate.

With this configuration, bridge portions can be provided according to the arrangement and the number of wheels of the work vehicle, and therefore the work vehicle can properly climb over the work unit.

The work portion may be a mowing blade and the work vehicle may be a mower.

With this configuration, the work unit can be used not only in a mower but also in various work vehicles.

In order to achieve the above-described third object, a work unit according to another embodiment of the present invention is a work unit to be attached to a lower side of a work vehicle that includes a wheel, the work unit including a work portion, a housing that covers the work portion, a bridge portion that is provided above the housing, an auxiliary plate that changes its position between a housed state of being housed in the bridge portion and a usage state of protruding from the bridge portion, a linkage mechanism that is provided in the bridge portion and is configured to change the position of the auxiliary plate, a lock mechanism that causes the auxiliary plate to enter a fixed state in which the auxiliary plate is fixed in the housed state or a displacement state in which the auxiliary plate is displaceable, and an operation tool for switching the lock mechanism between the fixed state and the displacement state.

As a result of the auxiliary plate being fixed in the housed state using the lock mechanism as described above, the auxiliary plate is kept from being accidentally displaced while the work portion is performing a work operation, and therefore the work portion can stably perform the work operation.

It is preferable that the work unit includes a pair of the auxiliary plates that protrude toward opposite sides from each other in a front-rear direction that is a longitudinal direction of the bridge portion, and the lock mechanism is provided for each of the auxiliary plates.

With this configuration, the auxiliary plates can be provided to protrude at least forward and rearward with respect to the work unit in order that the work vehicle can climb over the work unit. Therefore, the work vehicle can properly climb over the work unit.

It is preferable that the lock mechanism includes an engaged portion that is provided in the auxiliary plate and an engaging portion that is provided in the bridge portion and is changed by the operation tool between a position in the fixed state in which the engaging portion engages with the engaged portion and a position in the displacement state in which the engaging portion is disengaged from the engaged portion.

With this configuration, the auxiliary plate can be easily fixed in the housed state.

A configuration is also possible in which the engaged portion is a first protruding member, the engaging portion includes a shaft portion that passes through the bridge portion and rotates on its axis as the operation tool is operated, a main body portion that is supported by the shaft portion so as to be rotatable together with rotation of the shaft portion, and a recess that is provided in the main body portion, the fixed state is realized as a result of the main body portion rotating and the recess engaging with the first protruding member, and the displacement state is realized as a result of the main body portion rotating and the recess disengaging from the first protruding member.

Thus, a lock mechanism that has excellent operability can be realized with a simple configuration.

A configuration is also possible in which the engaged portion is a rod-shaped member, the engaging portion includes a shaft portion that passes through the bridge portion and rotates on its axis as the operation tool is operated, a hook that is supported by the shaft portion so as to be rotatable together with rotation of the shaft portion, and an elastic body that biases the hook toward the shaft portion, the fixed state is realized as a result of the hook rotating and engaging with the rod-shaped member, and the displacement state is realized as a result of the hook rotating and disengaging from the rod-shaped member.

Thus, a lock mechanism that has excellent operability can be realized with a simple configuration.

A configuration is also possible in which, when changing positions of the auxiliary plates from the housed state to the usage state, the linkage mechanism causes the auxiliary plates to rotate upward and then outward, the lock mechanism provided for a first auxiliary plate that is one of the auxiliary plates includes a rod-shaped member that is provided on the auxiliary plate and an engaging portion that is provided in the bridge portion, the engaging portion includes a shaft portion that passes through the bridge portion and rotates on its axis as the operation tool is operated, a hook that is supported by the shaft portion so as to be rotatable together with rotation of the shaft portion, and an elastic body that biases the hook toward the shaft portion, the fixed state is realized as a result of the hook rotating and engaging with the rod-shaped member, the displacement state is realized as a result of the hook rotating and disengaging from the rod-shaped member, and the lock mechanism provided for a second auxiliary plate that is the other auxiliary plate is a second protruding member that is fixed to an upper surface of the first auxiliary plate and protrudes toward a position above the second auxiliary plate.

With this configuration, the first auxiliary plate and the second auxiliary plate can be easily and reliably fixed.

It is preferable that a plurality of the bridge portions that each include the auxiliary plate are provided side by side in a left-right direction that intersects a longitudinal direction of the auxiliary plate.

With this configuration, bridge portions can be provided according to the arrangement and the number of wheels of the work vehicle, and therefore the work vehicle can properly climb over the work unit.

The work portion may be a mowing blade and the work vehicle may be a mower.

With this configuration, the work unit can be used not only in a mower but also in various work vehicles.

In order to achieve the above-described fourth object, a work unit according to another embodiment of the present invention is a work unit to be attached to a lower side of a work vehicle that includes a wheel, the work unit including a work portion, a housing that covers the work portion, a bridge portion that is provided above the housing, an auxiliary plate that changes its position between a housed state of being housed in the bridge portion and a usage state of protruding from the bridge portion, and a flange portion that is provided in the auxiliary plate and spans from an upper surface of the auxiliary plate to a position above a side surface of the bridge portion.

With this configuration, the flange portion can close a gap between the bridge portion and the auxiliary plate. Therefore, the intrusion of grass or soil into the bridge portion can be suppressed, and malfunctioning of the climb-over mechanism can be suppressed.

It is preferable that the work unit includes protrusions that are provided on the upper surface of the auxiliary plate.

As a result of the protrusions being provided on the upper surface of the auxiliary plate, friction between the auxiliary plate and the wheel of the work vehicle increases, and the wheel can be kept from slipping when the work vehicle travels over the auxiliary plate. Therefore, the work vehicle can stably travel over the work unit.

It is preferable that the auxiliary plate includes a pair of side plates that face each other and a top plate that is supported on the pair of side plates so as to extend past the side plates and constitutes the upper surface of the auxiliary plate, and portions of the top plate extending past the side plates serve as the flange portion.

Thus, the flange portion and the top plate can be formed as a single piece, and the flange portion can be provided with a simple configuration.

It is preferable that the auxiliary plate includes a pair of side plates that face each other, a top plate that is supported on the pair of side plates so as to extend past the side plates and constitutes the upper surface of the auxiliary plate, holes that are provided in the top plate, and projections that are provided on the side plates and protrude from the top plate passing through the holes, wherein portions of the top plate extending past the side plates serve as the flange portion, and portions of the projections protruding from the top plate serve as the protrusions.

With this configuration, the flange portion and the protrusions can be easily formed at the same time.

It is preferable that the work unit includes a pair of the auxiliary plates that protrude toward opposite sides from each other in a front-rear direction that is a longitudinal direction of the bridge portion.

With this configuration, the auxiliary plates can be provided to protrude at least forward and rearward with respect to the work unit in order that the work vehicle can climb over the work unit. Therefore, the work vehicle can properly climb over the work unit.

It is preferable that a plurality of the bridge portions that each include the auxiliary plate are provided side by side in a left-right direction that intersects a longitudinal direction of the auxiliary plate.

With this configuration, bridge portions can be provided according to the arrangement and the number of wheels of the work vehicle, and therefore the work vehicle can properly climb over the work unit.

The work portion may be a mowing blade and the work vehicle may be a mower.

With this configuration, the work unit can be used not only in a mower but also in various work vehicles.

BRIEF DESCRIPTION OF THE DRAWINGS

FIG. 7 is a schematic diagram showing the overall configuration of a climb-over mechanism in Embodiment 2.

FIG. 8 is a schematic diagram showing the configuration of a main portion of the climb-over mechanism in a housed state in Embodiment 2.

DETAILED DESCRIPTION OF PREFERRED EMBODIMENTS

First, the following describes, with reference to FIGS. 1 and 2, a mid-mount mower (hereinafter simply referred to as a mower) to which a mower unit is installed, as an example of a mid-mount work vehicle to which a work unit is installed. In the following description, a linear forward traveling direction and a linear rearward traveling direction of the mower will be referred to as a forward direction and a rearward direction, respectively. A direction that intersects the front-rear direction will be referred to as the left-right direction or a vehicle body transverse direction, and left and right are defined in a state of facing in the forward direction.

Figure 1:
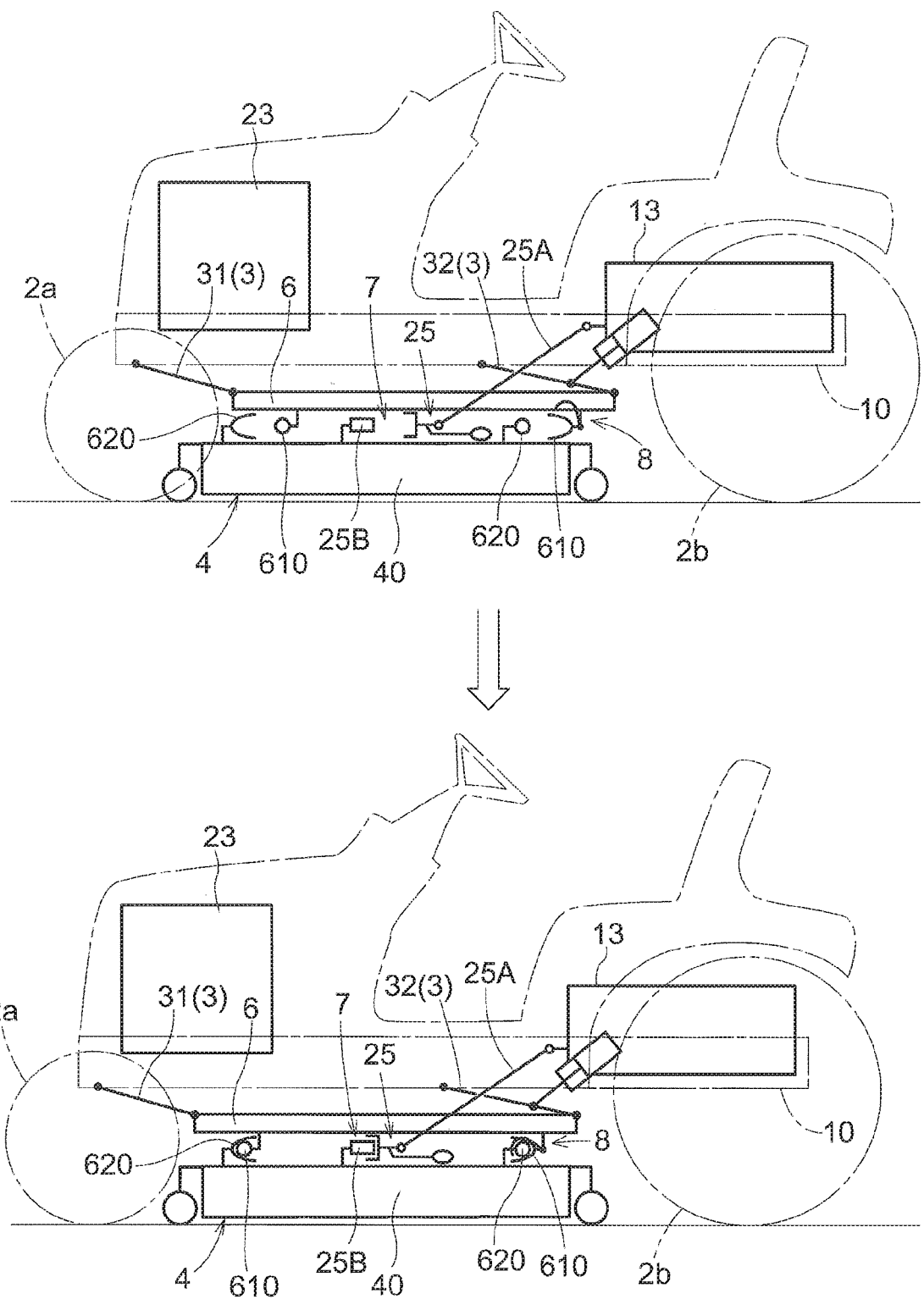
FIG. 1 is a schematic diagram showing a basic structure of a mid-mount mower according to the present invention.

FIG. 1 schematically shows states before and after a mower unit 4 is attached to a lifting/lowering linkage mechanism 3 provided on a main frame 10, which is the basic structure of the mower. The mower unit 4 is attached to the lifting/lowering linkage mechanism 3 as the mower moves in the front-rear direction. The lifting/lowering linkage mechanism 3 that is constituted by a pair of left and right front links 31 and a pair of left and right rear links 32 is provided in a lower portion of the vehicle body. An intermediate frame 6 is suspended from free ends of the front links 31 and free ends of the rear links 32. The free ends of the front links 31 and the free ends of the rear links 32 are coupled to the intermediate frame 6 via pivot shafts, and the intermediate frame 6 is lifted or lowered with respect to the ground as a result of the lifting/lowering linkage mechanism 3 pivoting. The intermediate frame 6 includes engaging portions 610, and engaged portions 620 that can be coupled with the engaging portions 610 are provided on a blade housing 40 (corresponding to a housing) of the mower unit 4.

As shown in FIG. 1, as a result of a front wheel 2a climbing over the mower unit 4 in an appropriate positional relationship, the engaging portions 610 of the intermediate frame 6 engage with the engaged portions 620 of the blade housing 40. Thus, the blade housing 40 is coupled to the intermediate frame 6 and consequently the mower unit 4 is coupled to the vehicle body of the mower. A lock mechanism 8 is provided to lock the engaging portions 610 and the engaged portions 620 in coupled positions (engaged state) and mechanically maintain the locked state. Constitutional members of the lock mechanism 8 are arranged within the range of the intermediate frame 6 in plan view of the vehicle body, although they are only schematically shown in FIG. 1.

Further, in order to transmit rotational motive power from an engine 23 to the mower unit 4 attached to the main frame 10, a blade motive power transmission mechanism 25 is set to a coupled state in which it can transmit motive power. The blade motive power transmission mechanism 25 is constituted by a vehicle body-side power transmission mechanism 25A and a mower-side power transmission mechanism 25B that are detached from or coupled to each other via a motive power coupling mechanism 7.

Figure 2:
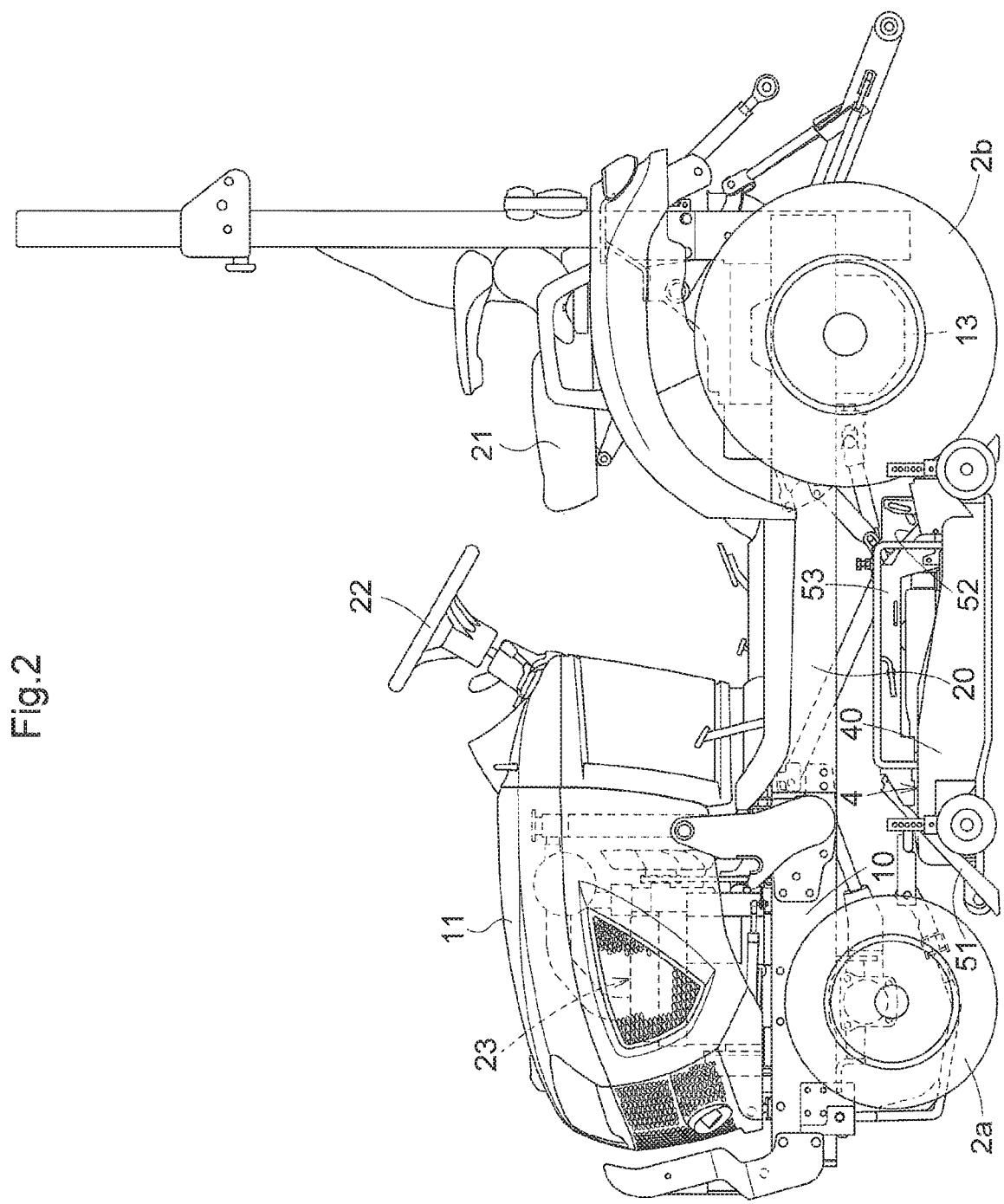
FIG. 2 is a side view of a mower equipped with a mower unit.

FIG. 2 shows one embodiment of the mower. The mower is equipped with the mower unit 4, which is installed between front wheels 2a and rear wheels 2b, and a water-cooling type engine (diesel engine) 23 that is covered by a hood 11 is installed in the front half portion of the main frame 10 of the mower, and a driver's seat 21 is arranged in the rear half portion of the main frame 10. The front wheels 2a are steerable wheels that are operated using a steering wheel 22, and also serve as drive wheels. The mower is a four-wheel-drive vehicle, and the rear wheels 2b also serve as drive wheels. A transmission case 13 is provided in the rear half portion of the main frame 10.

Figure 3:
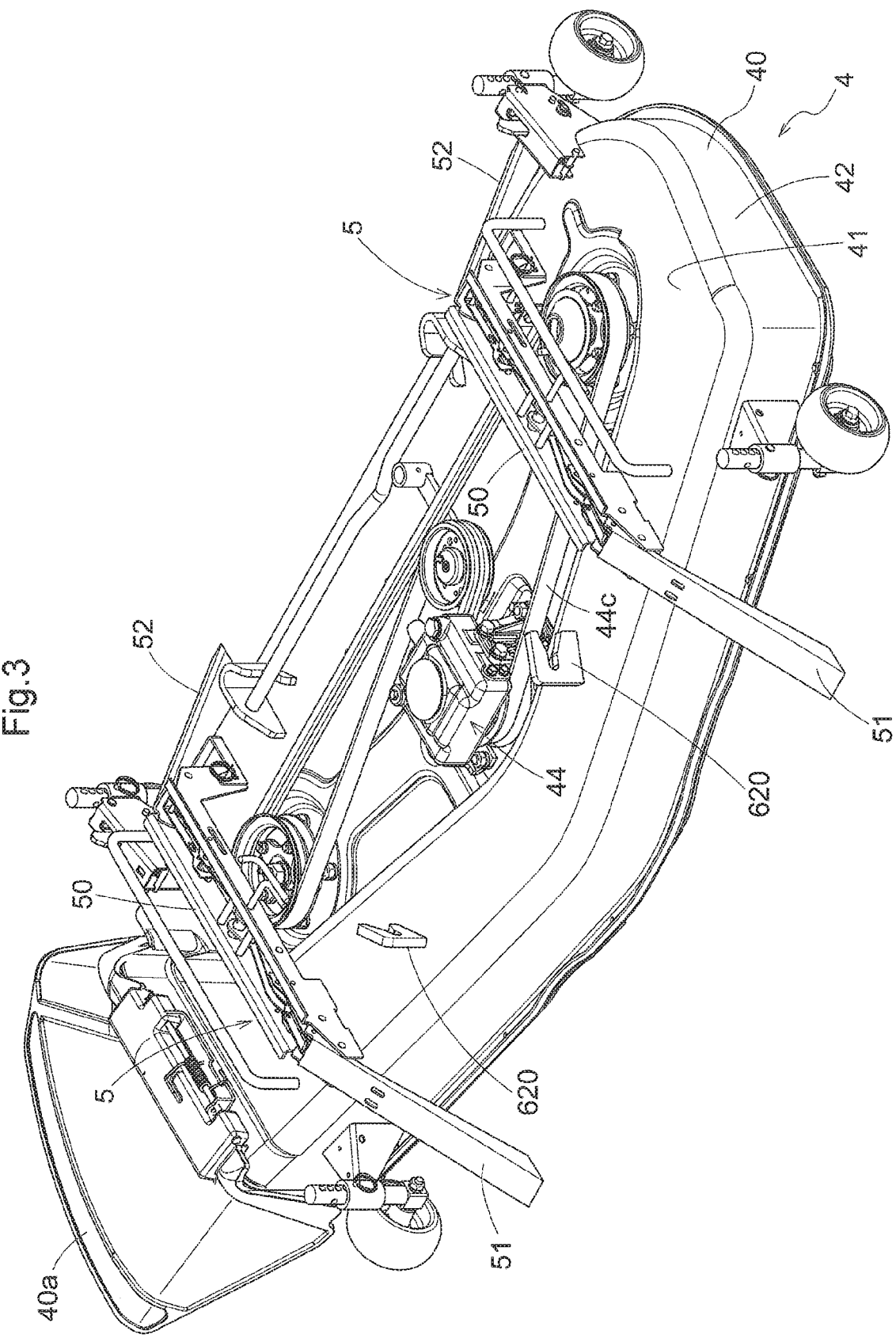
FIG. 3 is a perspective view of a mower unit.

As shown in FIG. 3, the mower unit 4 includes three mowing blades (corresponding to a work portion, not shown) that are arranged in the vehicle body transverse direction in plan view and rotate clockwise, and the blade housing (corresponding to a housing) 40 that covers these blades from above. The blade housing 40 includes a top plate 41 and a side plate 42 that extends downward from the peripheral edge of the top plate 41. A motive power distribution mechanism 44 for driving the blades is provided on the top plate 41 of the blade housing 40. A bulging portion that bulges upward and spans a front region of the blade housing 40 in the left-right direction is provided to form a conveyance path of mowed grass inside the blade housing 40. A discharge cover 40a is attached to the right end of the blade housing 40 that serves as an outlet of the conveyance path.

Next, a configuration for attaching the mower unit 4 to the mower will be described using FIGS. 1 to 3. When the mower unit 4 is to be attached to the vehicle body, the mower according to the present invention climbs over the mower unit 4, which is laterally laid on the ground, by travelling forward. For this purpose, the blade housing 40 is provided with a climb-over mechanism 5. The climb-over mechanism 5 is provided for each of the left and right front wheels 2a, and the distance between the climb-over mechanisms 5 corresponds to the tread width of the front wheels. Each climb-over mechanism 5 is constituted by a bridge portion 50 that extends in the front-rear direction above a belt transmission mechanism 44c, which is arranged on the top plate 41 of the blade housing 40, a front auxiliary plate 51 (corresponding to an auxiliary plate) that extends diagonally from a front end of the bridge portion 50 toward the ground, and a rear auxiliary plate 52 (corresponding to an auxiliary plate) that extends diagonally from a rear end of the bridge portion 50 toward the ground. The width of the bridge portion 50 is set such that the bridge portion 50 does not interfere with a sub frame 20 of the mower and the left and right front wheels 2a can stably move along the bridge portions 50. Details of the configuration of the climb-over mechanism 5 will be described later using FIGS. 4 to 10.

In order to attach the mower unit 4 to the underbody of the mower, first, the intermediate frame 6 is lowered to a lower limit position by an operation of the lifting/lowering linkage mechanism 3. Subsequently, the vehicle body is driven forward so that the front wheels 2a climb over the blade housing 40 by climbing up the rear auxiliary plates 52 from behind the mower unit 4 and moving along the bridge portions 50 above the blade housing 40 and the front auxiliary plates 51. When the front wheels 2a have climbed over the blade housing 40, the vehicle body is stopped, and the engaging portions 610 of the intermediate frame 6 engage with the engaged portions 620 of the blade housing 40.

After the vehicle body is stopped, an operator turns an operation lever (not shown) to make the blade motive power transmission mechanism 25 enter the coupled state in which it can transmit motive power. Further, the mower unit 4 is fixed to the vehicle body by the lock mechanism 8.

When the mower unit 4 is to be detached from the vehicle body, the lifting/lowering linkage mechanism 3 is lowered so that the mower unit 4 touches the ground, and then the operator turns the operation lever (not shown) to make the blade motive power transmission mechanism 25 enter a detached state. Further, the lock mechanism 8 is unlocked to release the mower unit 4 from the vehicle body. Then, the vehicle body is driven rearward so as to climb over the mower unit 4 using the climb-over mechanisms 5. As a result of the vehicle body traveling rearward, the engaging portions 610 of the intermediate frame 6 are disengaged from the engaged portions 620 of the blade housing 40. When the front wheels 2a have climbed over the blade housing 40, the mower unit 4 can be freely moved away from the vehicle body.

Climb-Over Mechanism

The following describes specific examples of the configuration of the climb-over mechanism 5 as embodiments of the present invention.

Embodiment 1

Figure 4:
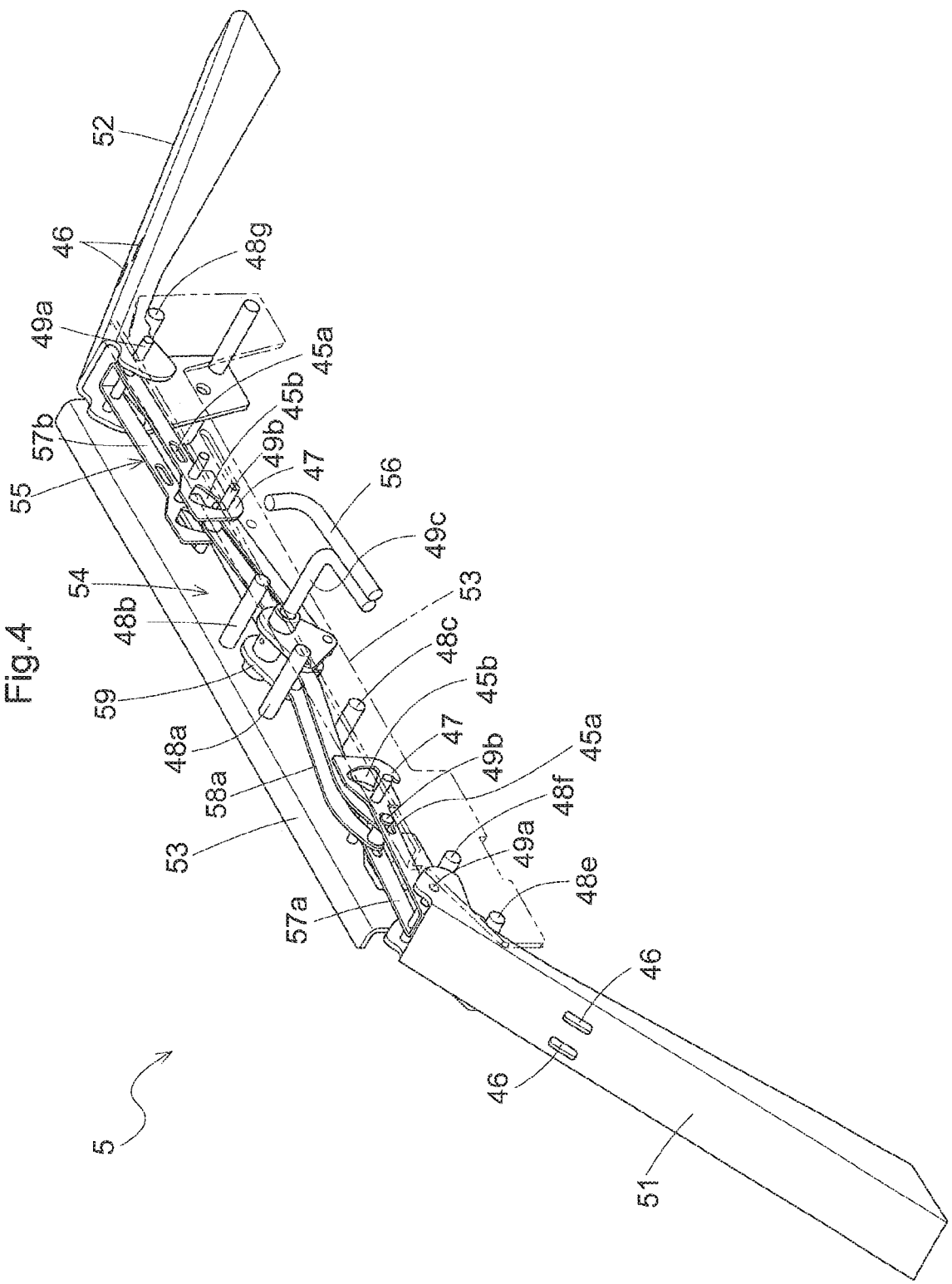
FIG. 4 is a schematic diagram showing the overall configuration of a climb-over mechanism in Embodiment 1.
Figure 5:
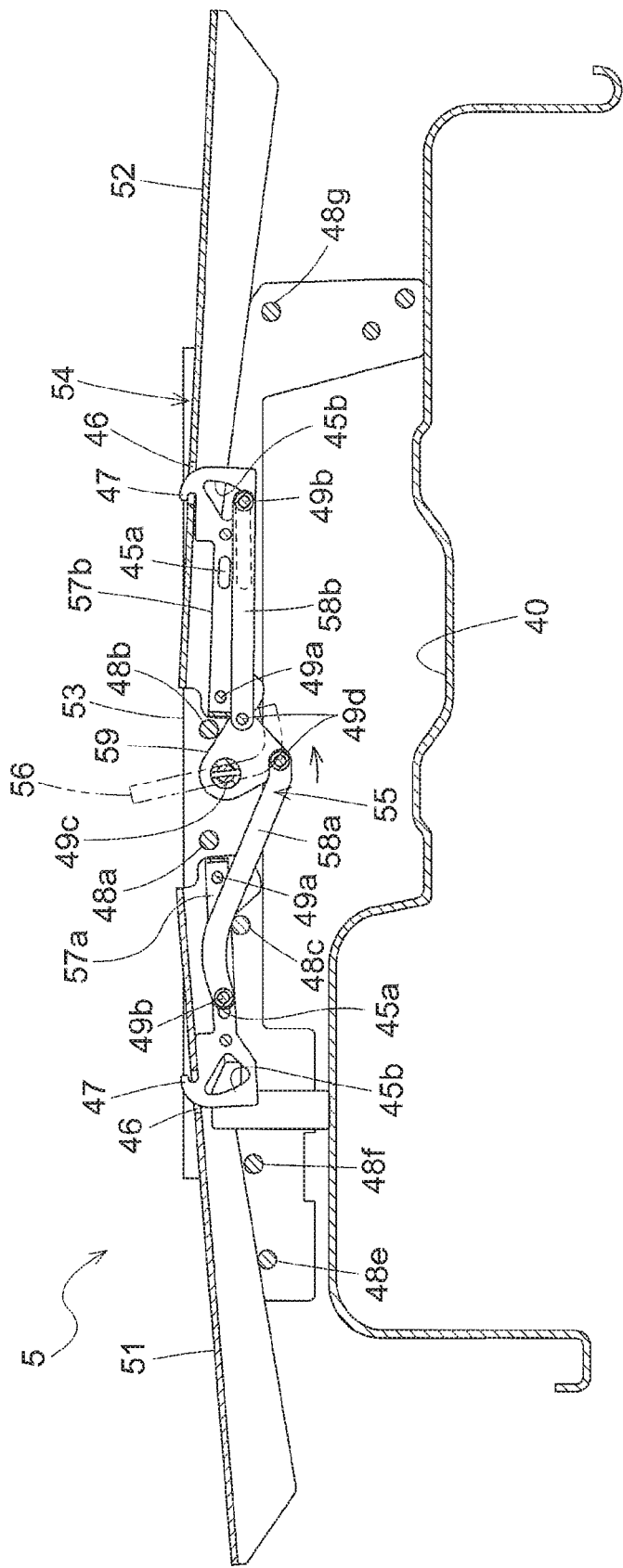
FIG. 5 is a schematic diagram showing the configuration of a main portion of the climb-over mechanism in a housed state in Embodiment 1.
Figure 6:
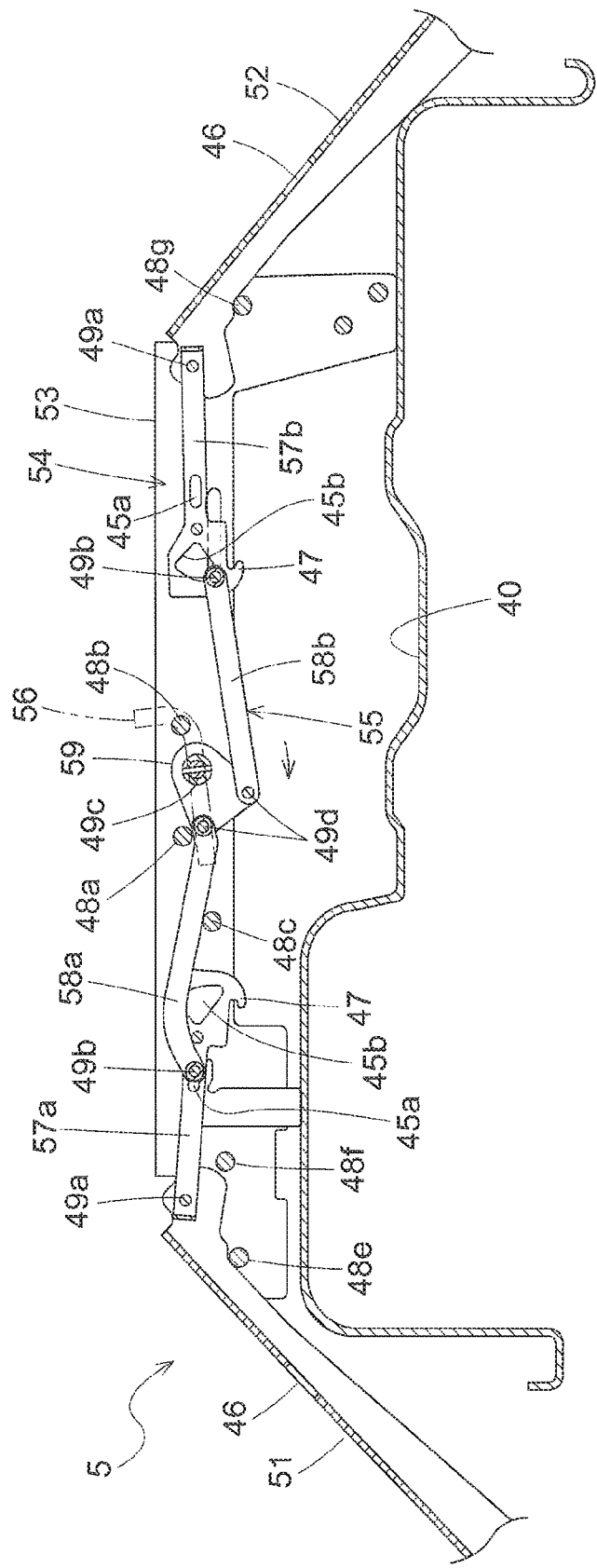
FIG. 6 is a schematic diagram showing the configuration of the main portion of the climb-over mechanism in a usage state in Embodiment 1.

The configuration of a climb-over mechanism in Embodiment 1 will be described using FIGS. 4 to 6 with reference to FIGS. 1 and 3. In FIGS. 4 to 6, some portions of the bridge portion are indicated by line-double-dash lines and an internal configuration thereof is shown in a transparent view.

As shown in FIG. 4, the climb-over mechanism 5 is provided in an upper portion of the mower unit 4, for example, above the blade housing 40. As shown in FIG. 3, for example, climb-over mechanisms 5 are provided side by side at two positions in the left-right direction so that the left and right front wheels 2a can climb over the respective climb-over mechanisms 5. Each climb-over mechanism 5 includes a front auxiliary plate 51 and a rear auxiliary plate 52 as a pair of auxiliary plates and a bridge portion 53 that is fixed to the upper portion of the mower unit 4. The bridge portion 53 includes a housing portion 54 that houses the front auxiliary plate 51 and the rear auxiliary plate 52, and a linkage mechanism 55. The front auxiliary plate 51 and the rear auxiliary plate 52 are normally housed in the housing portion 54 (see FIG. 5) and protrude outward when the climb-over mechanism 5 is used, to constitute slopes that the front wheel 2a can climb over (see FIG. 6). The linkage mechanism 55 is connected to inner end portions of the front auxiliary plate 51 and the rear auxiliary plate 52, and as a result of the linkage mechanism 55 operating, positions of the front auxiliary plate 51 and the rear auxiliary plate 52 can be changed between a state (hereinafter referred to as a "housed state") of being housed in the housing portion 54 and a state (hereinafter referred to as a "usage state") of protruding from the bridge portion 53. Further, a lever 56 (corresponding to an operation tool) is provided in the linkage mechanism 55, and as the lever 56 is operated, the linkage mechanism 55 operates to change positions of the front auxiliary plate 51 and the rear auxiliary plate 52.

The linkage mechanism 55 includes a first front arm 57a, a second front arm 58a, a lever plate 59, a first rear arm 57b, and a second rear arm 58b.

The first front arm 57a is connected to the front auxiliary plate 51. A support pin 49a passes through one end region of the first front arm 57a and one end region of the front auxiliary plate 51, and the first front arm 57a and the front auxiliary plate 51 are supported so as to be rotatable relative to each other about the support pin 49a. Note that the other end region of the front auxiliary plate 51 comes into contact with or comes close to the ground or the like by protruding. Openings 45a and 45b are provided in the other end region of the first front arm 57a. A support pin 49b passes through the opening 45a of the first front arm 57a and one end region of the second front arm 58a, and the first front arm 57a and the second front arm 58a are supported so as to be rotatable relative to each other about the support pin 49b. The lever plate 59 is supported by the bridge portion 53 via a support pin 49c that is fixed to a side wall of the bridge portion 53, so as to be rotatable about the support pin 49c. A support pin 49d passes through the other end region of the second front arm 58a and the lever plate 59, and the second front arm 58a is supported so as to be rotatable about the support pin 49d.

The lever 56 is fixed to one end of the support pin 49c so as to be rotatable about the support pin 49c that is supported by the bridge portion 53 at the other end thereof. The lever 56 is an operation tool for changing positions of the front auxiliary plate 51 and the rear auxiliary plate 52 to the housed state or the usage state. As the lever 56 is turned, the linkage mechanism 55 is operated via the lever plate 59 to change positions of the front auxiliary plate 51 and the rear auxiliary plate 52 to the housed state or the usage state. The operation range of the lever plate 59 is restricted by a restriction pin 48a and a restriction pin 48b, and when the lever plate 59 comes to a position at which it abuts against the restriction pin 48a, the front auxiliary plate 51 and the rear auxiliary plate 52 enter the usage state, and when the lever plate 59 comes to a position at which it abuts against the restriction pin 48b, the front auxiliary plate 51 and the rear auxiliary plate 52 enter the housed state, as described later.

The first rear arm 57b is connected to the rear auxiliary plate 52. A support pin 49a passes through one end region of the first rear arm 57b and one end region of the rear auxiliary plate 52, and the first rear arm 57b and the rear auxiliary plate 52 are supported so as to be rotatable relative to each other about the support pin 49a. Note that the other end region of the rear auxiliary plate 52 comes into contact with or comes close to the ground or the like by protruding. Openings 45a and 45b are provided in the other end region of the first rear arm 57b. A support pin 49b passes through the opening 45b of the first rear arm 57b and one end region of the second rear arm 58b, and the first rear arm 57b and the second rear arm 58b are supported so as to be rotatable relative to each other about the support pin 49b. A support pin 49d passes through the other end region of the second rear arm 58b and the lever plate 59, and the second rear arm 58b is supported so as to be rotatable about the support pin 49d.

When the lever 56 is turned to a position at which the lever plate 59 abuts against the restriction pin 48b, the housed state is realized in which the linkage mechanism 55 is folded and the front auxiliary plate 51 and the rear auxiliary plate 52 connected to the linkage mechanism 55 are housed in the housing portion 54 as shown in FIG. 5.

When the lever 56 turns from the restriction pin 48a toward the restriction pin 48b, the second front arm 58a moves toward the lever 56 as the lever plate 59 rotates. Here, a restriction pin 48c is provided on a side wall of the housing portion 54. The second front arm 58a moves while being in contact with the restriction pin 48c, and the movement of the second front arm 58a is restricted by the restriction pin 48c. When the lever 56 turns from the restriction pin 48a toward the restriction pin 48b, a portion of the second front arm 58a supported by the support pin 49d moves downward and a portion of the second front arm 58a supported by the support pin 49b moves upward as a result of the movement of the second front arm 58a being restricted by the restriction pin 48c. That is, the second front arm 58a rotates about the restriction pin 48c. As the second front arm 58a rotates, the first front arm 57a moves toward the lever 56. Here, a restriction pin 48e and a restriction pin 48f are provided on the side wall of the housing portion 54. Movement of the front auxiliary plate 51 is restricted by the restriction pins 48e and 48f and movement of the first front arm 57a connected to the front auxiliary plate 51 is also restricted. As a result, as the second front arm 58a rotates, the first front arm 57a rotates about the support pin 49b by approximately 180°. Along with this, a portion of the front auxiliary plate 51 supported by the support pin 49a moves toward the lever 56, and the front auxiliary plate 51 is housed in the housing portion 54. Claws 47 are provided at leading ends of the first front arm 57a and the first rear arm 57b, and holes 46 are provided in the front auxiliary plate 51 and the rear auxiliary plate 52. In the housed state, the claws 47 are inserted into the holes 46 to restrict the front auxiliary plate 51 and the rear auxiliary plate 52 from protruding unintentionally.

Likewise, when the lever 56 turns from the restriction pin 48a toward the restriction pin 48b, the position of the rear auxiliary plate 52 changes to the housed state. Regarding the rear auxiliary plate 52, displacement of the support pin 49b is restricted within the opening 45b, and movement of the rear auxiliary plate 52 is restricted by a restriction pin 48g that is provided at the side wall of the housing portion 54. As a result, the first rear arm 57b rotates about the support pin 49b and the rear auxiliary plate 52 is housed in the housing portion 54.

When the lever 56 is turned to a position at which the lever plate 59 abuts against the restriction pin 48a, the usage state is realized in which the linkage mechanism 55 is extended and the front auxiliary plate 51 and the rear auxiliary plate 52 connected to the linkage mechanism 55 protrude from the housing portion 54 as shown in FIG. 6.

When the lever 56 turns from the restriction pin 48b toward the restriction pin 48a, the first front arm 57a and the first rear arm 57b rotate about the support pins 49b, and the claws 47 exit the holes 46. Thereafter, portions of the first front arm 57a and the first rear arm 57b supported by the support pins 49a extend outward (in the front-rear direction), and the front auxiliary plate 51 and the rear auxiliary plate 52 enter the usage state where they protrude from the housing portion 54.

As described above, according to the configuration of Embodiment 1, the linkage mechanism 55 can be folded or unfolded by merely turning the lever 56 and positions of the front auxiliary plate 51 and the rear auxiliary plate 52 can be easily changed between the housed state and the usage state.

Embodiment 2

Figure 9:
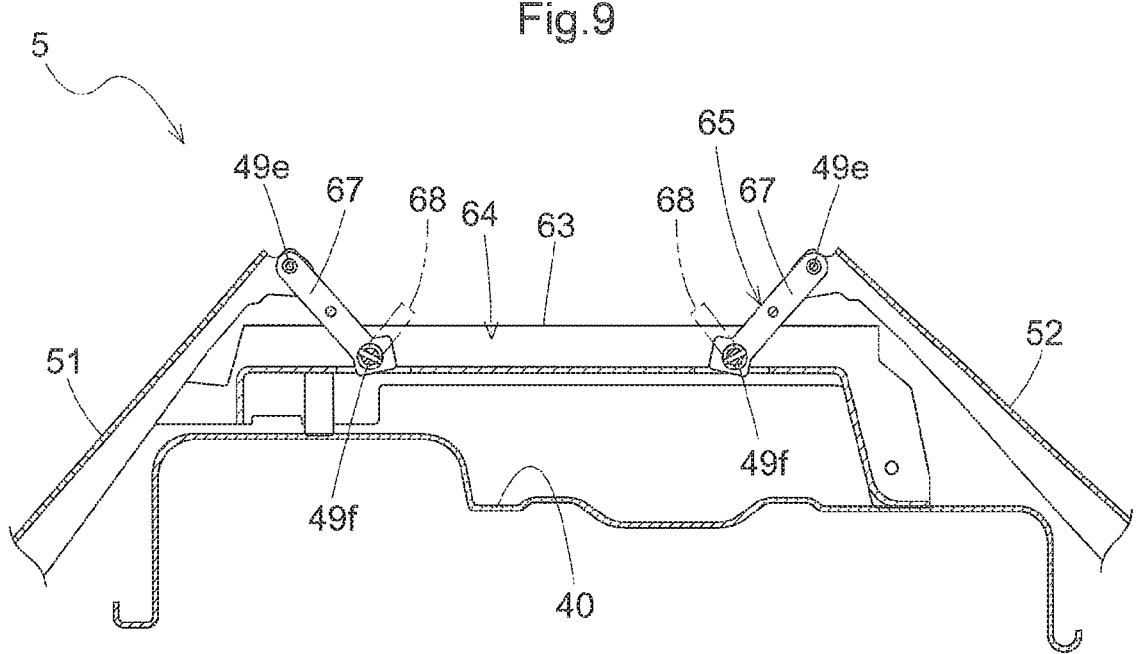
FIG. 9 is a schematic diagram showing the configuration of the main portion of the climb-over mechanism in a usage state in Embodiment 2.

The configuration of a climb-over mechanism in Embodiment 2 will be described using FIGS. 7 to 9 with reference to FIGS. 1 and 3.

As shown in FIG. 7, the climb-over mechanism 5 is provided in an upper portion of the mower unit 4, for example, above the blade housing 40. As shown in FIG. 3, for example, climb-over mechanisms 5 are provided side by side at two positions in the left-right direction so that the left and right front wheels 2a can climb over the respective climb-over mechanisms 5. Each climb-over mechanism 5 includes the front auxiliary plate 51 and the rear auxiliary plate 52 as a pair of auxiliary plates, a bridge portion 63 that is fixed to the upper portion of the mower unit 4, and a linkage mechanism 65. The bridge portion 63 includes two side walls that are arranged in the left-right direction and a housing portion 64 that houses the front auxiliary plate 51 and the rear auxiliary plate 52. The front auxiliary plate 51 and the rear auxiliary plate 52 are normally housed in the housing portion 64 and protrude outward when the climb-over mechanism 5 is used, to constitute slopes that the front wheel 2a can climb over. The linkage mechanism 65 is connected to inner end portions of the front auxiliary plate 51 and the rear auxiliary plate 52, and as a result of the linkage mechanism 65 operating, positions of the front auxiliary plate 51 and the rear auxiliary plate 52 can be changed between a state (hereinafter referred to as a "housed state") of being housed in the housing portion 64 and a state (hereinafter referred to as a "usage state") of protruding from the bridge portion 63. Further, a lever 66 (corresponding to an operation tool) is provided in the linkage mechanism 65, and as the lever 66 is operated, the linkage mechanism 65 operates to change positions of the front auxiliary plate 51 and the rear auxiliary plate 52.

The linkage mechanism 65 includes front and rear arms 67 and rotation levers 68 for rotating the respective arms 67. One of the pair of arms 67 is connected at one end thereof to the front auxiliary plate 51 via a support pin 49e, and this arm 67 and the front auxiliary plate 51 are rotatable relative to each other about the support pin 49e. The other of the pair of arms 67 is connected at one end thereof to the rear auxiliary plate 52 via a support pin 49e, and this arm 67 and the rear auxiliary plate 52 are rotatable relative to each other about the support pin 49e. Other ends of the respective arms 67 are supported by a side wall of the bridge portion 63 via support pins 49f so as to be rotatable together with the support pins 49f. The support pins 49f are supported so as to be rotatable together with the rotation levers 68, and when the rotation levers 68 rotate, the support pins 49f also rotate in the same direction and the arms 67 also rotate in the same direction. Note that each rotation lever 68 is formed into an L-shape, and a leading end portion of the rotation lever 68 is bent to protrude toward the lever 66.

The lever 66 is supported by a side wall of the bridge portion 63 via a lever stay 66a. The lever 66 includes a pair of protruding portions 66b that protrude in the front-rear direction. The protruding portions 66b rotate as the lever 66 reciprocates in the up-down direction. Specifically, each protruding portion 66b is a rod-shaped member that is formed into a U-shape, and one end of each rod-shaped protruding portion 66b is fixed to a lever main body 66c, and the other end of the protruding portion 66b is supported by the lever main body 66c in such a manner that the lever main body 66c is rotatable. The protruding portions 66b abut against protruding portions of the rotation levers 68, a rotational force of the protruding portions 66b is transmitted to the rotation levers 68, and as the protruding portions 66b rotate, the rotation levers 68 also rotate.

In the climb-over mechanism 5 including the linkage mechanism 65 and the lever 66 as described above, when the lever 66 is pressed upward, the protruding portions 66b rotate. As the protruding portions 66b rotate, the protruding portions 66b press the rotation levers 68 and the rotation levers 68 rotate. As the rotation levers 68 rotate, each arm 67 also rotates in such a manner that its portion connected to the front auxiliary plate 51 (rear auxiliary plate 52) rotates rearward (forward) (i.e., inward). As a result of the arms 67 rotating, the front auxiliary plate 51 and the rear auxiliary plate 52 move inward in the front-rear direction and are housed in the housing portion 64. This state is the housed state.

To the contrary, when the lever 66 is pressed downward, the protruding portions 66b rotate. As the protruding portions 66b rotate, the protruding portions 66b press the rotation levers 68 and the rotation levers 68 rotate. As the rotation levers 68 rotate, each arm 67 also rotates in such a manner that its portion connected to the front auxiliary plate 51 (rear auxiliary plate 52) rotates forward (rearward) (i.e., outward). As a result of the arms 67 rotating, the front auxiliary plate 51 and the rear auxiliary plate 52 move outward in the front-rear direction and form slopes. This state is the usage state.

As described above, according to the configuration of Embodiment 2 as well, the linkage mechanism 65 can be folded or unfolded by merely moving the lever 66 in the up-down direction, and positions of the front auxiliary plate 51 and the rear auxiliary plate 52 can be easily changed between the housed state and the usage state.

In the climb-over mechanism 5 according to Embodiment 2, the lever 66 may be provided with an elastic body, such as a tension spring 69, that spans between the lever main body 66c and the side wall of the bridge portion 63. If the tension spring 69 is provided, in a state in which the lever 66 is located at an upper position, a biasing force that pulls the lever main body 66c toward the bridge portion 63 acts on the upper side of the lever 66. Also, in a state in which the lever 66 is located at a lower position, a biasing force that pulls the lever main body 66c toward the bridge portion 63 acts on the lower side of the lever 66. As a result, in both states in which the lever 66 is located at an upper position and a lower position, the posture of the lever 66 is maintained and the lever 66 is kept from being accidentally operated by a weak external force such as vibration.

Embodiment 3

The configuration of a climb-over mechanism in Embodiment 3 will be described using FIG. 10 with reference to FIGS. 1 and 3. Note that a state in which the front auxiliary plate 51 and the rear auxiliary plate 52 protrude is indicated by line-double-dash lines in FIG. 10.

Figure 10:
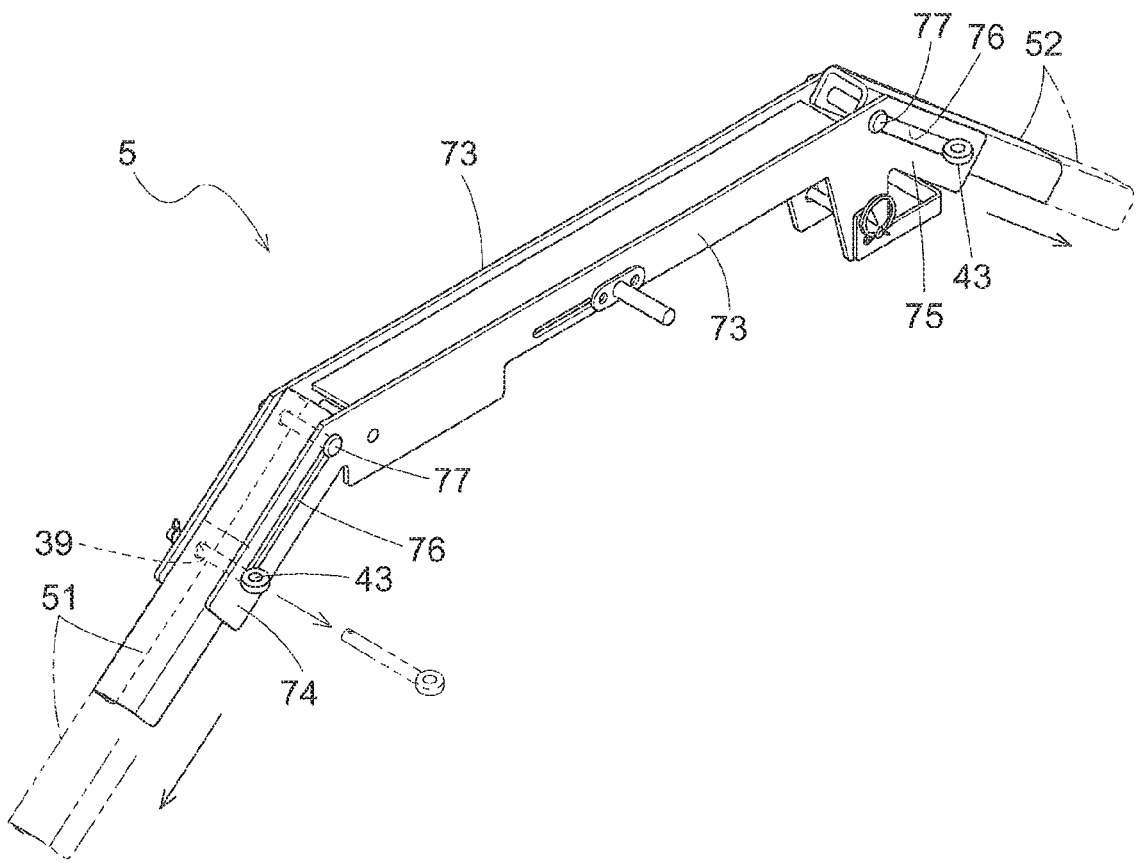
FIG. 10 is a schematic diagram showing the overall configuration of a climb-over mechanism in Embodiment 3.

As shown in FIG. 10, the climb-over mechanism 5 is provided in an upper portion of the mower unit 4, for example, above the blade housing 40. As shown in FIG. 3, for example, climb-over mechanisms 5 are provided side by side at two positions in the left-right direction so that the left and right front wheels 2a can climb over the respective climb-over mechanisms 5. Each climb-over mechanism 5 includes the front auxiliary plate 51 and the rear auxiliary plate 52 as a pair of auxiliary plates, a bridge portion 73 that is fixed to the upper portion of the mower unit 4, and fixing pins 43 (each corresponding to a pin).

The bridge portion 73 includes a front housing portion 74 and a rear housing portion 75 (each corresponding to a support portion). The front housing portion 74 protrudes diagonally forward and downward, and the rear housing portion 75 protrudes diagonally rearward and downward. The front housing portion 74 and the rear housing portion 75 each include two parallel side walls, and openings 76 that extend in parallel with the protruding direction are formed in the side walls.

One end of the front auxiliary plate 51 and one end of the rear auxiliary plate 52 are respectively supported by the front housing portion 74 and the rear housing portion 75 via support pins 77. The support pins 77 pass through the front auxiliary plate 51, the rear auxiliary plate 52, and the openings 76 in the side walls of the front housing portion 74 and the rear housing portion 75.

The front auxiliary plate 51 and the rear auxiliary plate 52 each have an opening 39 in an upper end region thereof. In the housed state, the front auxiliary plate 51 and the rear auxiliary plate 52 are pulled up along the front housing portion 74 and the rear housing portion 75, respectively. Then, the fixing pins 43 are inserted to pass through the openings 39 of the front auxiliary plate 51 and the rear auxiliary plate 52 and the openings 76. When the front auxiliary plate 51 and the rear auxiliary plate 52 slide down to positions at which the fixing pins 43 abut against lower ends of the openings 76, the front auxiliary plate 51 and the rear auxiliary plate 52 are held in this state. This state is the housed state.

When positions of the front auxiliary plate 51 and the rear auxiliary plate 52 are to be changed to the usage state, the fixing pins 43 are removed. As a result of the fixing pins 43 being removed, the front auxiliary plate 51 and the rear auxiliary plate 52 further slide down along the front housing portion 74 and the rear housing portion 75, respectively, under their own weight (the state indicated by the line-double-dash lines in the drawing). The front auxiliary plate 51 and the rear auxiliary plate 52 stop sliding as a result of the support pins 77 abutting against the lower end portions of the openings 76. Thus, the front auxiliary plate 51 and the rear auxiliary plate 52 enter the usage state and constitute slopes.

As described above, the front auxiliary plate 51 and the rear auxiliary plate 52 slide down under their own weight merely as a result of removing the fixing pins 43, and therefore positions of the front auxiliary plate 51 and the rear auxiliary plate 52 can be easily changed from the housed state to the usage state according to the configuration of Embodiment 3 as well. Further, when compared to the climb-over mechanisms 5 in Embodiments 1 and 2, the number of components can be reduced and the burden of manufacturing the climb-over mechanism can be mitigated.

The mid-mount work vehicle is not necessarily required to climb over the mower unit by travelling forward, and a configuration is also possible in which climb-over mechanisms 5 are provided according to the number of rear wheels that are arranged in the left-right direction, and the mid-mount work vehicle climbs over the mower unit by travelling rearward.

Embodiment 4

Figure 11:
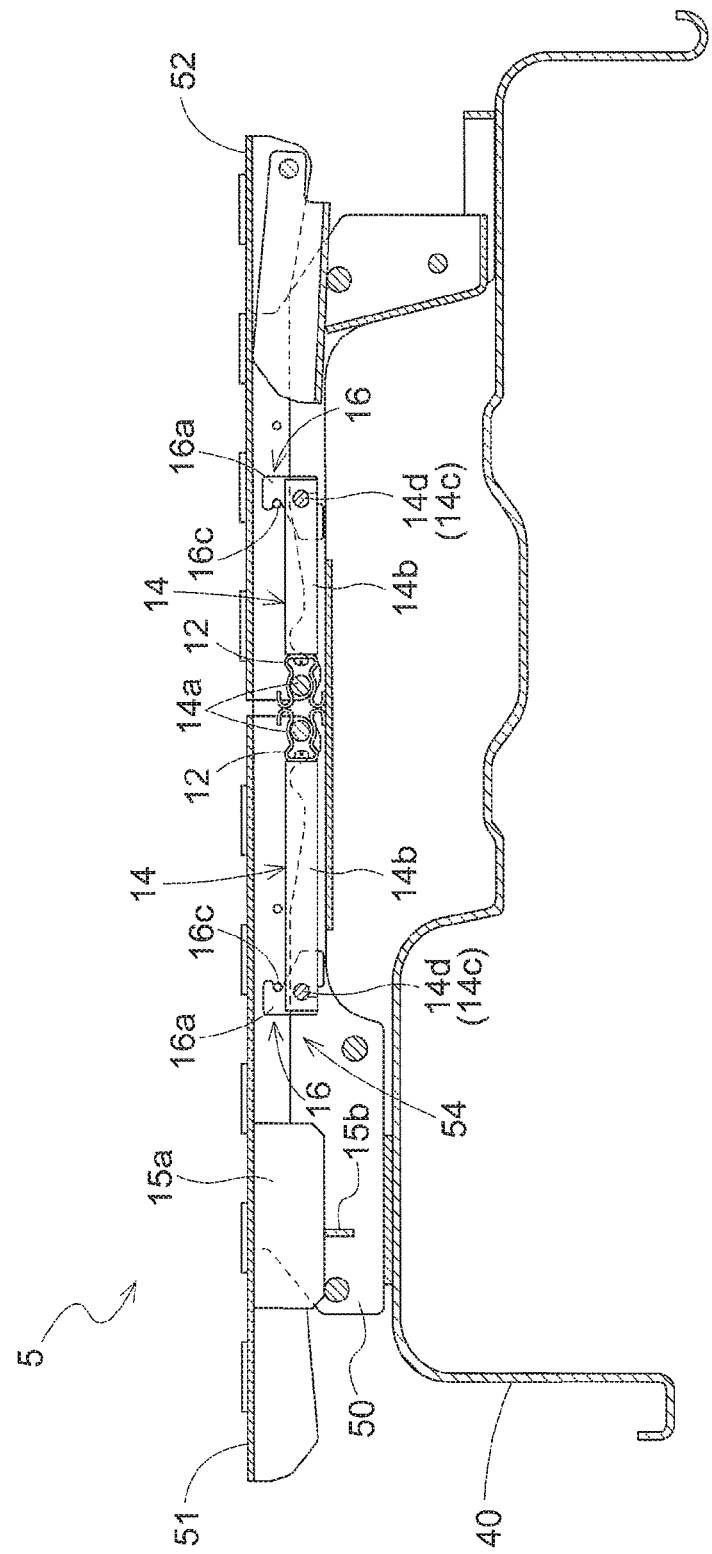
FIG. 11 is a cross-sectional view of a climb-over mechanism in a housed state in Embodiment 4.
Figure 12:
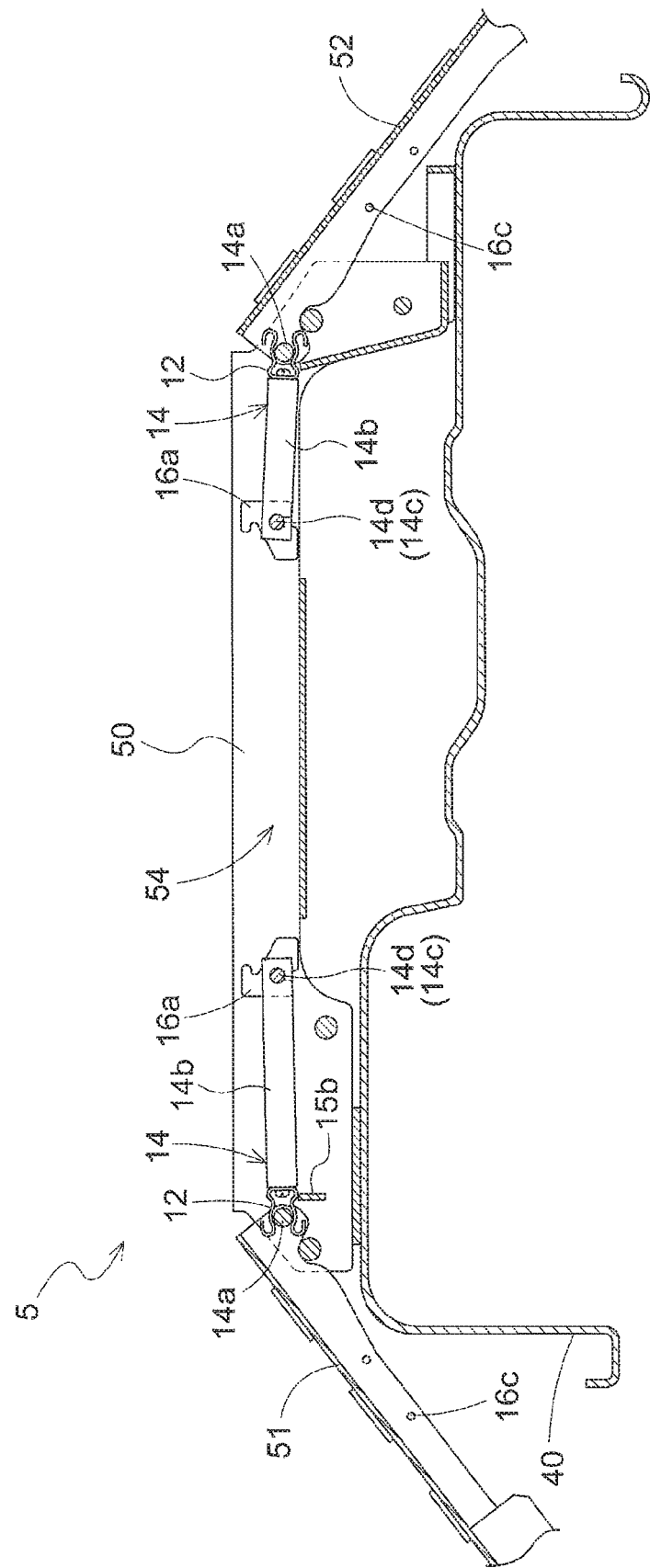
FIG. 12 is a cross-sectional view of the climb-over mechanism in a usage state in Embodiment 4.

The following describes a specific example of the configuration of the climb-over mechanism 5 in Embodiment 4 using FIGS. 11 and 12 with reference to FIGS. 1 and 3.

The climb-over mechanism 5 is provided in an upper portion of the mower unit 4, for example, above the blade housing 40. As shown in FIG. 3, for example, climb-over mechanisms 5 are provided side by side at two positions in the left-right direction so that the left and right front wheels 2a can climb over the respective climb-over mechanisms 5. Each climb-over mechanism 5 includes the front auxiliary plate 51 and the rear auxiliary plate 52 as a pair of auxiliary plates and a bridge portion 50 that is fixed to the upper portion of the mower unit 4. The bridge portion 50 includes a housing portion 54 that houses the front auxiliary plate 51 and the rear auxiliary plate 52, and linkage mechanisms 14. The front auxiliary plate 51 and the rear auxiliary plate 52 are normally housed in the housing portion 54 (the state shown in FIG. 11) and protrude outward when the climb-over mechanism 5 is used, to constitute slopes that the front wheel 2a can climb over (the state shown in FIG. 12). The linkage mechanisms 14 are connected to inner end portions of the front auxiliary plate 51 and the rear auxiliary plate 52, and as a result of the linkage mechanisms 14 operating, positions of the front auxiliary plate 51 and the rear auxiliary plate 52 can be changed between a state (hereinafter referred to as a "housed state") of being housed in the housing portion 54 and a state (hereinafter referred to as a "usage state") of protruding from the bridge portion 50. Positions of the front auxiliary plate 51 and the rear auxiliary plate 52 are each manually changed depending on use conditions, and are fixed in the housed state using a lock mechanism, which will be described later.

The front auxiliary plate 51 and the rear auxiliary plate 52 are provided with the linkage mechanisms 14, respectively.

Each linkage mechanism 14 includes an engaging portion 12, an engaged portion 14a, a rod 14b, and a shaft 14d. The engaging portion 12 is connected to an inner end portion of the rod 14b. The shaft 14d is provided inside the housing portion 54 of the bridge portion 50 so as to extend in a direction that intersects the longitudinal direction of the bridge portion 50. A hole 14c is provided in an outer end region of the rod 14b. The rod 14b is supported by the shaft 14d that passes through the hole 14c. The engaged portions 14a are provided at inner end portions of the front auxiliary plate 51 and the rear auxiliary plate 52 and engage with the engaging portions 12. The engaged portions 14a are, for example, shafts that extend in a direction that intersects the longitudinal directions of the front auxiliary plate 51 and the rear auxiliary plate 52. In the linkage mechanism 14 configured as described above, as a result of the rods 14b rotating about the shafts 14d and the front auxiliary plate 51 and the rear auxiliary plate 52 rotating about the engaged portions 14a, positions of the front auxiliary plate 51 and the rear auxiliary plate 52 can be changed between the housed state and the usage state.

Further, plates 15a are provided in lower portions of the front auxiliary plate 51 and the rear auxiliary plate 52. The bridge portion 50 includes restriction portions 15b that are provided in the housing portion 54. In the housed state, the front auxiliary plate 51 and the rear auxiliary plate 52 are positioned as a result of the plates 15a abutting against the restriction portions 15b of the housing portion 54.

Engaging Portion

Figure 13:
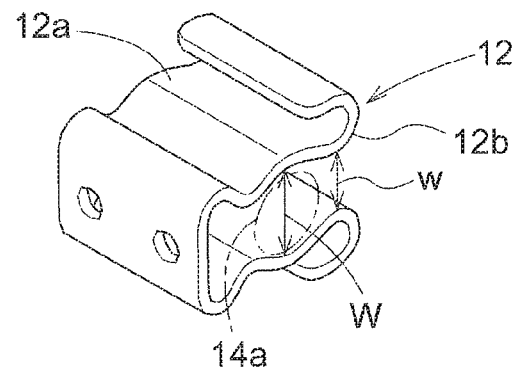
FIG. 13 is a perspective view of an engaging portion in Embodiment 4.

As shown in FIGS. 11 to 13, each engaging portion 12 is formed by bending a plate-shaped member or a wire-shaped member so as to have a U-shape in a cross section in which opposite end regions with respect to the approximate center thereof face each other. The engaging portion 12, which is a U-shaped member, is formed using a plate-shaped member or a wire-shaped member that is made of spring steel or the like and has a strong elastic force, for example. The engaging portion 12 includes two or more bulging portions 12a that face each other and bulge away from each other. The engaging portion 12 also includes two or more narrowed portions 12b that bulge toward each other and are located on the end portion side with respect to the bulging portions 12a. The inner diameter w between the narrowed portions 12b is smaller than the inner diameter W between the bulging portions 12a and is smaller than the maximum outer diameter of the engaged portion 14a.

The engaging portion 12 is engaged with the engaged portion 14a in such a manner that the pin-shaped engaged portion 14a is held between the bulging portions 12a and is restricted by the narrowed portions 12b so as to not protrude from the bulging portions 12a. When engaging the engaging portion 12 with the engaged portion 14a, the engaged portion 14a enters between the bulging portions 12a by expanding a gap between the narrowed portions 12b against the elastic force of the engaging portion 12. Unless an external force that can expand the gap between the narrowed portions 12b to the maximum outer diameter of the engaged portion 14a or larger is applied to the engaged portion 14a, the engaged portion 14a is held between the bulging portions 12a and the engagement between the engaging portion 12 and the engaged portion 14a is maintained. To the contrary, if an external force that can expand the gap between the narrowed portions 12b to the maximum outer diameter of the engaged portion 14a or larger is applied to the engaged portion 14a, the engaged portion 14a springs out by expanding the gap between the narrowed portions 12b, and is disengaged from the engaging portion 12.

An excessive external force may be applied to the climb-over mechanism 5 when the mower climbs over the mower unit 4 (see FIG. 3), for example. If the front auxiliary plate 51 and the rear auxiliary plate 52 are fixed to the rods 14b, a fixing portion between the rod 14b and the front auxiliary plate 51 or the rear auxiliary plate 52, the front auxiliary plate 51, the rear auxiliary plate 52, or the like may be deformed or damaged at this time.

However, in the linkage mechanism 14 including the engaging portion 12 as described above, if a large external force is applied to the climb-over mechanism 5, the engaged portion 14a disengages from the engaging portion 12 before the fixing portion or the like is damaged, and therefore deformation and damage of the climb-over mechanism 5 can be prevented. Furthermore, the front auxiliary plate 51 and the rear auxiliary plate 52 can be easily attached to or detached from the rods 14b, and therefore maintenance of the climb-over mechanism 5 can be easily performed by removing the front auxiliary plate 51 and the rear auxiliary plate 52 from the rods 14b, and the front auxiliary plate 51 and the rear auxiliary plate 52 can be easily attached to the rods 14b after maintenance has been carried out.

Lock Mechanism

Next, a lock mechanism 16 of the climb-over mechanism 5 will be described using FIG. 14 with reference to FIGS. 11 and 12.

The climb-over mechanism 5 is in the housed state during a work operation of the mower unit 4 (see FIG. 3). If the front auxiliary plate 51 or the rear auxiliary plate 52 is displaced during a work operation of the mower unit 4 (see FIG. 3), the work operation will be hindered, and therefore the front auxiliary plate 51 and the rear auxiliary plate 52 need to be fixed. The lock mechanism 16 is used to fix the front auxiliary plate 51 and the rear auxiliary plate 52 in the housed state.

The lock mechanism 16 includes a lock plate 16a (corresponding to an engaging portion), a pin 16c (corresponding to a first protruding member), and a lever 16d (corresponding to an operation tool), and is provided for each of the front auxiliary plate 51 and the rear auxiliary plate 52. The lock plate 16a is rotatably supported by the shaft 14d (corresponding to a shaft portion). The lock plate 16a includes a recess 16b in a free end region of a main body portion of the lock plate 16a. The lever 16d is linked to the shaft 14d, and as the shaft 14d is rotated on its axis by operating the lever 16d, the lock plate 16a rotates together with the shaft 14d. The pins 16c are fixed to lower portions of the front auxiliary plate 51 and the rear auxiliary plate 52 so as to extend in a direction that intersects the longitudinal directions of the front auxiliary plate 51 and the rear auxiliary plate 52. In a state in which the front auxiliary plate 51 and the rear auxiliary plate 52 are positioned by the plates 15a and the restriction portions 15b in the housed state, the lock plate 16a rotates as the lever 16d is operated, and the recess 16b engages with the pin 16c. Thus, the front auxiliary plate 51 and the rear auxiliary plate 52 in the housed state are fixed by the lock plates 16a of the lock mechanisms 16 and displacement of the front auxiliary plate 51 and the rear auxiliary plate 52 is restricted. When changing positions of the front auxiliary plate 51 and the rear auxiliary plate 52 from the housed state to the usage state, first, the lock mechanism 16 is unlocked. At this time, the lever 16d is operated to rotate the lock plate 16a and disengage the recess 16b from the pin 16c. Thus, the front auxiliary plate 51 and the rear auxiliary plate 52 enter a state in which their positions can be freely changed. In this state, positions of the front auxiliary plate 51 and the rear auxiliary plate 52 are changed from the housed state to the usage state. Note that the above-described linkage mechanism 14 is configured such that positions of the front auxiliary plate 51 and the rear auxiliary plate 52 are changed by manually raising the front auxiliary plate 51 and the rear auxiliary plate 52, but a configuration is also possible in which the linkage mechanism 14 includes another lever for changing positions of the front auxiliary plate 51 and the rear auxiliary plate 52.

As described above, the front auxiliary plate 51 and the rear auxiliary plate 52 can be fixed in the housed state using the lock mechanism 16, and therefore the front auxiliary plate 51 and the rear auxiliary plate 52 can be kept from being accidentally displaced during a work operation of the mower unit 4 (see FIG. 3), and the work operation can be stably performed. Furthermore, the front auxiliary plate 51 and the rear auxiliary plate 52 are positioned in the housed state by the plates 15a and the restriction portions 15b, and therefore the front auxiliary plate 51 and the rear auxiliary plate 52 can be more properly and more easily fixed using the lock mechanism 16. Note that, although it is not essential to provide a lock mechanism used in the usage state, positioning mechanisms and lock mechanisms, such as pins, for fixing the front auxiliary plate 51 and the rear auxiliary plate 52 in the usage state may be separately provided.

Auxiliary Plate

Figure 15:
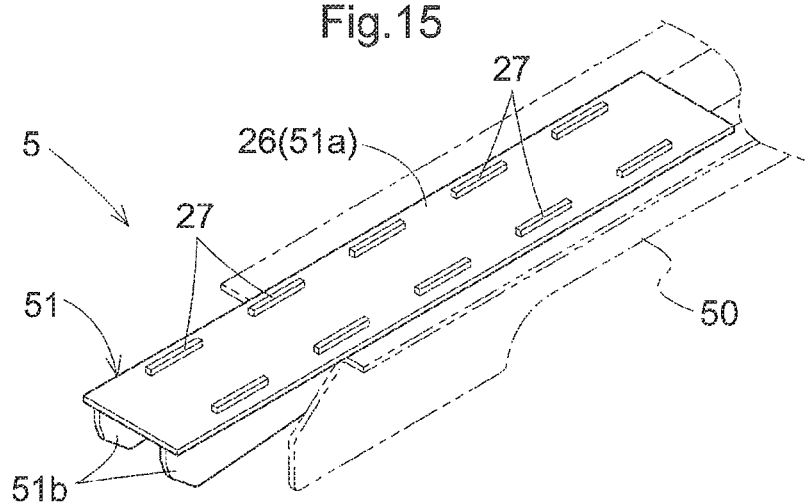
FIG. 15 is a perspective view of an auxiliary plate in Embodiment 4.
Figure 16:
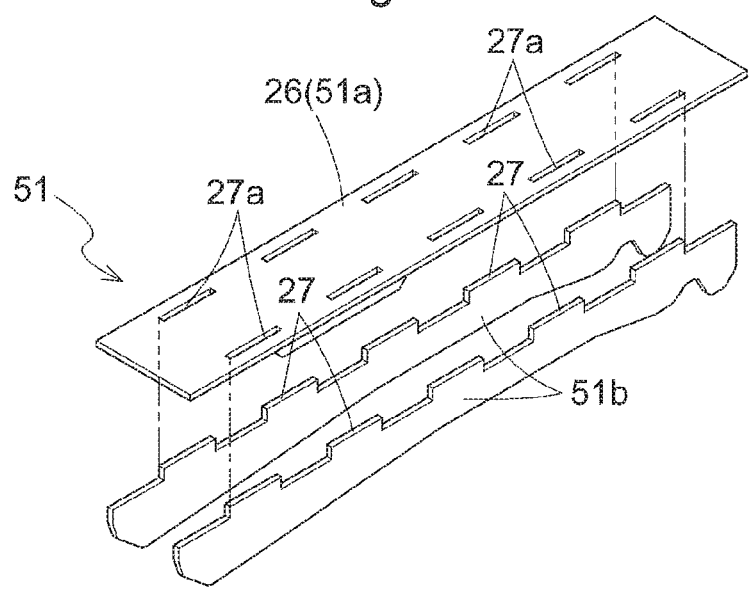
FIG. 16 is an exploded perspective view of the auxiliary plate in Embodiment 4.

Next, the configuration of an auxiliary plate will be described using FIGS. 15 and 16. Although FIGS. 15 and 16 show only the front auxiliary plate 51, the front auxiliary plate 51 and the rear auxiliary plate 52 have the same configuration.

The front auxiliary plate 51 and the rear auxiliary plate 52 each include a top plate 51a and side plates 51b. The top plate 51a includes flange portions 26 that protrude from the side plates 51b toward the bridge portion 50 in a direction that intersects the longitudinal directions of the front auxiliary plate 51 and the rear auxiliary plate 52. An end portion of each flange portion 26 reaches an upper portion of the bridge portion 50 and overlaps the bridge portion 50 in plan view. The front auxiliary plate 51 and the rear auxiliary plate 52 also have a plurality of protrusions 27 on a surface of the top plate 51a along which the front wheel 2a (see FIG. 2) of the mower moves.

The top plate 51a and the side plates 51b are separate members, for example, and the front auxiliary plate 51 and the rear auxiliary plate 52 are each constituted by a combination of the top plate 51a and two side plates 51b. Each side plate 51b is a plate-shaped member and includes a plurality of protrusions 27 on one side surface thereof. The top plate 51a is a plate-shaped member and includes a plurality of holes 27a that are arranged in parallel with two long sides of the top plate 51a and are located inward from edges of the top plate extending along the two sides, by a predetermined distance. The holes 27a extend through the top plate 51a and are slightly larger than the protrusions 27 so that the protrusions 27 can be inserted into the holes 27a. The arrangement of the holes 27a corresponds to the arrangement of the protrusions 27. The height of the protrusions 27 is larger than the thickness of the top plate 51a. In a state in which the two side plates 51b stand and the top plate 51a is arranged so as to extend in a direction that intersects the two side plates 51b, the holes 27a are aligned with the protrusions 27 and the protrusions 27 are inserted into the holes 27a, and thus the top plate 51a is combined with the side plates 51b. Regions of the top plate 51a that are located outward of the holes 27a in the combined state serve as the flange portions 26. With this configuration, in a state in which the front auxiliary plate 51 and the rear auxiliary plate 52 are housed in the bridge portion 50, the flange portions 26 of the front auxiliary plate 51 and the rear auxiliary plate 52 partially overlap the bridge portion 50 and close gaps between the bridge portion 50 and each of the front auxiliary plate 51 and the rear auxiliary plate 52. Further, leading ends of the protrusions 27 protrude from the top plate 51a.

Apart from when installing the mower unit 4 (see FIG. 3), the climb-over mechanism 5 is in the housed state, for example, during a mowing operation. If there are gaps between the bridge portion 50 and the front auxiliary plate 51 and the rear auxiliary plate 52 in the housed state, grass or soil enters the linkage mechanism 14 (see FIG. 11) and the like via the gaps, and hinders the climb-over mechanism 5 from changing its position or causes malfunctioning of the climb-over mechanism 5. However, if the flange portions 26 are provided, gaps between the bridge portion 50 and the front auxiliary plate 51 and the rear auxiliary plate 52 can be closed and the intrusion of grass or soil into the climb-over mechanism 5 via the gaps can be suppressed. As a result, malfunctioning of the climb-over mechanism 5 can be suppressed, and smooth operations of the climb-over mechanism 5 can be maintained.

Furthermore, if the protrusions 27 are provided on the top plates 51a of the front auxiliary plate 51 and the rear auxiliary plate 52, the mower can be kept from slipping when travelling over the climb-over mechanism 5 and can stably travel over the climb-over mechanism 5. As a result, the mower unit 4 (see FIG. 3) can be accurately and easily installed to the mower, and the mower can be kept from deviating from the auxiliary plates and damaging the climb-over mechanism 5 or the mower unit 4 (see FIG. 3). Also, the protrusions 27 are formed by combining the top plate 51a with the side plates 51b, and therefore the protrusions 27 can be more easily formed when compared to a case in which the protrusions 27 are formed through pressing or the like.

Anti-Slip Member

Figure 17:
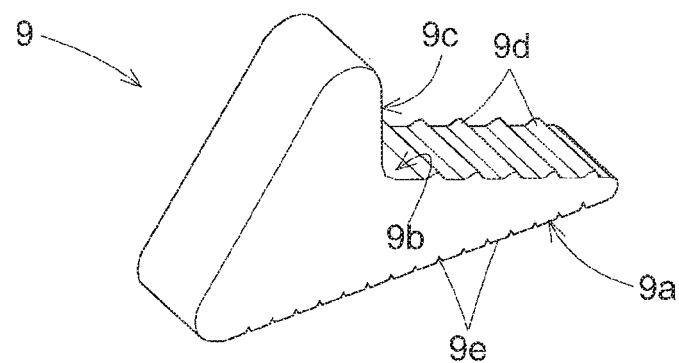
FIG. 17 is a perspective view of an anti-slip member in Embodiment 4.

Next, an example of the configuration of an anti-slip member 9 will be described using FIGS. 3 and 17.

When the mower travels over the climb-over mechanism 5, one or more anti-slip members 9 are interposed between the mower unit 4 and the ground in order to keep the mower unit 4 from being displaced by pressure applied by the traveling mower. Each anti-slip member 9 includes a holding portion that presses the mower unit 4 from a direction that is parallel to the traveling direction of the mower, and displacement of the mower unit 4 is suppressed as a result of displacement of the anti-slip member 9 being suppressed by a frictional force that acts between the anti-slip member 9 and the ground.

The anti-slip member 9 is made of rubber, for example, and includes a bottom surface 9a, an inclined surface 9b that gradually becomes higher from one end of the bottom surface 9a toward the other end thereof, and a receiving portion 9c that rises from an upper end of the inclined surface 9b more sharply than the inclined surface. The inclined surface 9b and the receiving portion 9c correspond to the holding portion. A plurality of protrusions 9d are provided on the inclined surface 9b. The protrusions 9d are elongated in a direction that intersects the inclination direction of the inclined surface 9b, for example. Uneven portions 9e are provided on the bottom surface 9a to increase the frictional force that acts on the bottom surface 9a.

When the anti-slip member 9 is inserted between the mower unit 4 and the ground, the bottom surface 9a comes into contact with the ground, the receiving portion 9c comes into contact with a side surface of the mower unit 4, the inclined surface 9b comes into contact with a bottom portion of the mower unit 4, and a corner portion of a bottom surface of the mower unit 4 is located between the receiving portion 9c and the protrusions 9d. Thus, the anti-slip member 9 holds the mower unit 4 using the receiving portion 9c, the inclined surface 9b, and a region between the receiving portion 9c and the protrusions 9d. The anti-slip member 9 is kept from sliding owing to the frictional force acting between the bottom surface 9a and the ground. Therefore, the mower unit 4 held by the anti-slip member 9 is kept from being displaced by pressure applied by the mower, for example.

As described above, displacement of the mower unit 4 is suppressed by the anti-slip member 9, and therefore the mower can stably travel over the climb-over mechanism 5, and the mower unit 4 can be easily and reliably attached.

Figure 14:
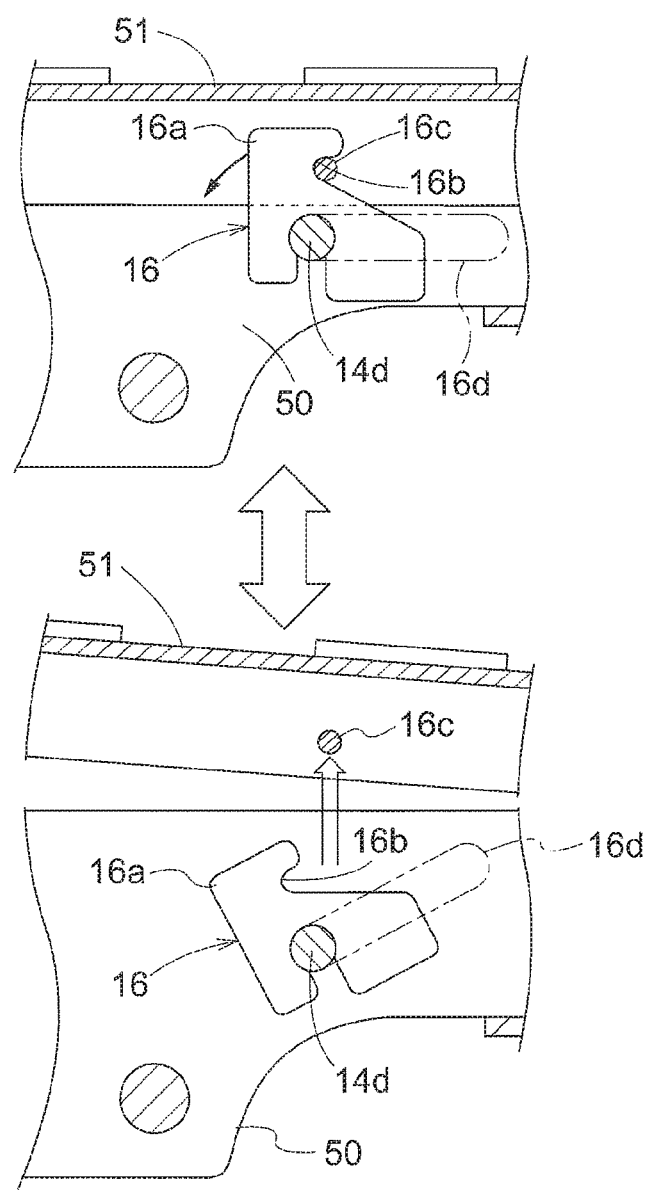
FIG. 14 is a side view showing an open state and a closed state of a main portion of a lock mechanism in Embodiment 4.
Figure 18:
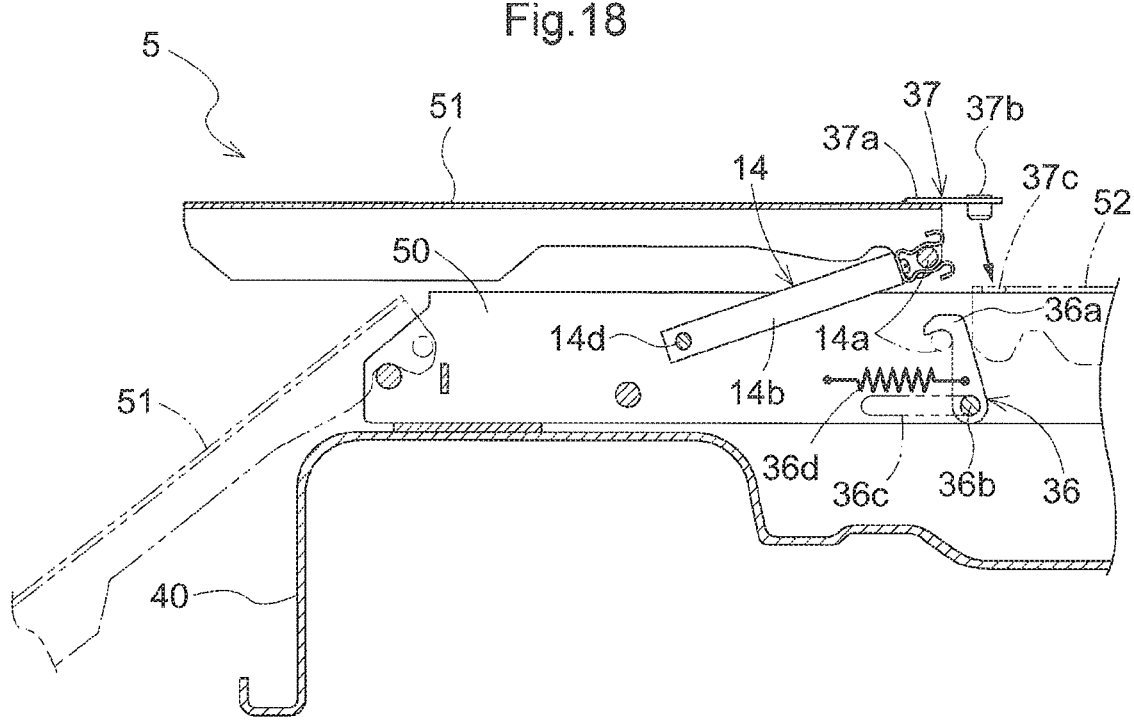
FIG. 18 is a side view showing the configuration of a main portion of a lock mechanism in another embodiment.
Figure 19:
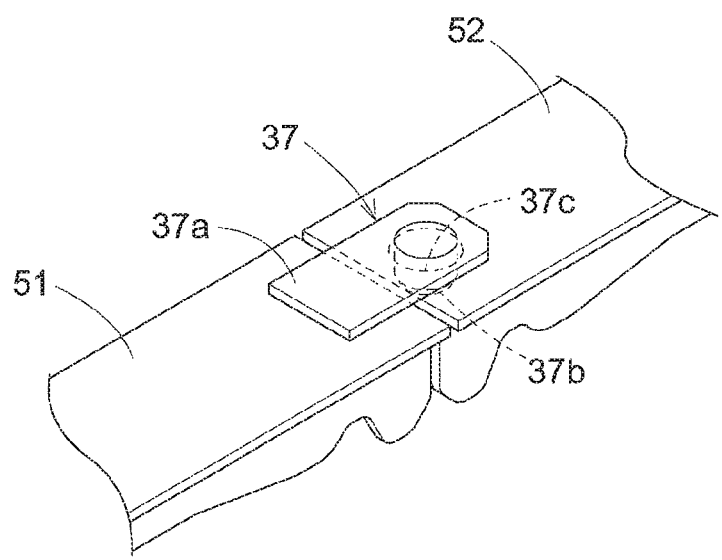
FIG. 19 is a perspective view showing a main portion around a fixing portion of the lock mechanism in the other embodiment.

OTHER EMBODIMENTS (1) A lock mechanism 35 can be provided instead of the above-described lock mechanism 16 (see FIG. 14). The following describes the configuration of the lock mechanism 35 using FIGS. 18 and 19. Portions of the climb-over mechanism 5 other than the lock mechanism 35, such as the front auxiliary plate 51, the rear auxiliary plate 52, the linkage mechanism 14, the bridge portion 50, etc., have configurations similar to those shown in FIGS. 11 to 14, and a description thereof is omitted. In the following description, the front auxiliary plate 51 and the rear auxiliary plate 52 may be replaced with each other.

The lock mechanism 35 includes a hook lock 36 and a fixing portion 37. The hook lock 36 fixes only the front auxiliary plate 51 in the housed state, and includes a hook portion 36a (corresponding to a hook) that serves as an engaging portion, a shaft 36b (corresponding to a shaft portion), a lever 36c (corresponding to an operation tool), and an elastic body such as a spring 36d. The shaft 36b is supported by the bridge portion 50 so as to be rotatable on its axis and extends in a direction that intersects the longitudinal direction of the bridge portion 50. The hook portion 36a has the shape of a hook with a bent leading end and is supported by the shaft 36b so as to be rotatable about the shaft 36b. The lever 36c is linked to the shaft 36b, and as the shaft 36b is rotated on its axis by operating the lever 36c, the hook portion 36a rotates together with the shaft 36b. When the front auxiliary plate 51 and the rear auxiliary plate 52 are in the housed state, the hook portion 36a is engaged with the engaged portion 14a of the front auxiliary plate 51 to fix the front auxiliary plate 51 in the housed state. The spring 36d biases the hook portion 36a toward the engaged portion 14a as a result of one end of the spring 36d being supported by the bridge portion 50 and the other end of the spring 36d being supported by the hook portion 36a. The front auxiliary plate 51 fixed by the hook portion 36a is kept in the housed state under the biasing force of the spring 36d. With this configuration, the hook lock 36 serves as a lock mechanism for the front auxiliary plate 51.

The fixing portion 37 serves as a lock mechanism for the rear auxiliary plate 52 and is configured to fix the rear auxiliary plate 52 by using the front auxiliary plate 51 fixed by the hook lock 36. The fixing portion 37 includes a plate 37a (corresponding to a second protruding member) and a pin 37b. One end portion of the plate 37a is fixed, through welding or the like, to an upper surface of the front auxiliary plate 51 fixed by the hook lock 36, and the other end portion of the plate 37a protrudes toward the rear auxiliary plate 52. A hole 37c is provided in an end region of the rear auxiliary plate 52 that is adjacent to the front auxiliary plate 51. The pin 37b is provided on a back surface of the protruding other end portion of the plate 37a. In the housed state, the pin 37b is inserted into the hole 37c. Therefore, displacement of the rear auxiliary plate 52 is restricted by the plate 37a and the pin 37b, and the position of the rear auxiliary plate 52 cannot be changed from the housed state to the usage state unless the fixing portion 37 is raised. The fixing portion 37 is fixed to the front auxiliary plate 51 that is fixed by the hook lock 36. Thus, the front auxiliary plate 51 and the rear auxiliary plate 52 are fixed in the housed state by the lock mechanism 35 constituted by the hook lock 36 and the fixing portion 37.

As described above, displacement of the front auxiliary plate 51 and the rear auxiliary plate 52 is restricted in the housed state, and therefore displacement of the front auxiliary plate 51 and the rear auxiliary plate 52 during a work operation of the mower unit 4 (see FIG. 3) is suppressed, and the work operation can be efficiently performed.

(2) In the above-described embodiment, the linkage mechanism and the auxiliary plate are connected to each other using a pin that serves as the engaged portion 14a and a U-shaped elastic member that serves as the engaging portion 12, but any configuration may be adopted for the engaged portion 14a and the engaging portion 12 so long as the engaged portion 14a, such as a pin, and the elastic member are connected to each other with predetermined strength, and the engaged portion 14a and the engaging portion 12 are separated from each other when a force that exceeds the predetermined strength is applied to the engaged portion 14a and the engaging portion 12. Also, any shape and material may be adopted for the elastic member that serves as the engaging portion 12 so long as the engaging portion 12 can hold the engaged portion 14a. A configuration is also possible in which, instead of the engaging portion 12, the engaged portion 14a is constituted by an elastic member, or both the engaged portion 14a and the engaging portion 12 are constituted by elastic members.

(3) The flange portion 26 is not necessarily required to be formed as a single piece with the top plate 51a of the front auxiliary plate 51 or the rear auxiliary plate 52, and a configuration is also possible in which the flange portion 26 is formed as a separate member that is connected to the top plate 51a. The front auxiliary plate 51 and the rear auxiliary plate 52 are not necessarily required to include both the flange portion 26 and the protrusions 27, and a configuration is also possible in which only the flange portion 26 or the protrusions 27 are included. A configuration is also possible in which at least the flange portion 26 or the protrusions 27 are provided in at least the front auxiliary plate 51 or the rear auxiliary plate 52. A configuration is also possible in which the flange portion 26 and the protrusions 27 are not provided in both the front auxiliary plate 51 and the rear auxiliary plate 52.

(4) A configuration is also possible in which the fixing portion 37 of the lock mechanism 35 does not include the pin 37b. In this case, only the plate 37a that is supported by the auxiliary plate fixed by the hook lock 36 is used to restrict displacement of the other auxiliary plate by pressing the other auxiliary plate.

(5) In each of the above-described embodiments, the number of wheels of the mid-mount work vehicle, such as a mower, is not limited to four, and may also be three or five or more. Alternatively, the mid-mount work vehicle may be equipped with a crawler, rather than a wheel. Climb-over mechanisms 5 are provided according to the number of front wheels or crawlers that are arranged in the left-right direction. For example, if there is one front wheel, one climb-over mechanism 5 is provided, and if there are three front wheels, three climb-over mechanisms 5 are provided.

(6) The configuration of the front auxiliary plate 51 and the rear auxiliary plate 52 is not limited to the above-described configuration, and a configuration is also possible in which two plates are overlaid on each other and can be extended and contracted. Plates constituting each of the front auxiliary plate 51 and the rear auxiliary plate 52 are overlaid on each other in the housed state and protrude from one side in the usage state. With this configuration, the front auxiliary plate 51 and the rear auxiliary plate 52 can be compactly housed while a sufficient length thereof is ensured in the usage state.

(7) The mid-mount work vehicle is not necessarily required to climb over the mower unit by travelling forward, and a configuration is also possible in which climb-over mechanisms 5 are provided according to the number of rear wheels that are arranged in the left-right direction, and the mid-mount work vehicle climbs over the mower unit by travelling rearward.

The present invention can be applied to various work units, such as a mower unit, that are installed to a mid-mount work vehicle.

What is claimed is:

1. A work unit with at least one auxiliary plate to be attached to a lower side of a work vehicle that includes a wheel, the work unit comprising:
a work portion;
a housing that covers the work portion;
a bridge portion that is provided above the housing;
the at least one auxiliary plate;
a linkage mechanism that is provided in the bridge portion and is connected to the at least one auxiliary plate; and
a lever attached to and configured to operate the linkage mechanism,
wherein the at least one auxiliary plate changes its position between a state of being housed in the bridge portion and a state of protruding from the bridge portion, and
wherein, as a result of rotating the lever, the linkage mechanism is folded or unfolded, and the position of the at least one auxiliary plate is changed between the state of being housed in the bridge portion and the state of protruding from the bridge portion.

2. The work unit according to claim 1,
wherein the lever reciprocates between one end and an other end, and the linkage mechanism is folded or unfolded as the lever reciprocates.

3. The work unit according to claim 2, further comprising an elastic body that is connected to the bridge portion and an end region of the lever that is located opposite to the bridge portion,
wherein, when the lever reciprocates between one end and an other end, if the lever is located at the one end, the elastic body biases the lever toward the one end, and if the lever is located at the other end, the elastic body biases the lever toward the other end.

4. The work unit according to claim 1,
wherein the bridge portion spans from a front end region to a rear end region of the housing in a front-rear direction along a longitudinal direction of the at least one auxiliary plate, and
wherein the at least one auxiliary plate comprises a front auxiliary plate and a rear auxiliary plate that are arranged in the front-rear direction and change their positions in opposite directions from each other and are provided as a pair of the auxiliary plates in the bridge portion.

5. The work unit according to claim 1,
wherein a plurality of the bridge portions that each include the at least one auxiliary plate are provided side by side in a left-right direction that intersects a longitudinal direction of the at least one auxiliary plate, the longitudinal direction extending parallel to the at least one auxiliary plate.

6. The work unit according to claim 1,
wherein the work portion is a mowing blade, and the work vehicle is a mower.

7. A work unit with an auxiliary plate to be attached to a lower side of a work vehicle that includes a wheel, the work unit comprising:
a work portion;
a housing that covers the work portion;
a bridge portion that is provided above the housing;
an auxiliary plate that changes its position between a state of being housed in the bridge portion and a state of protruding from the bridge portion;
a linkage mechanism that is provided in the bridge portion and is connected to the auxiliary plate; and
an operation tool attached to the linkage mechanism,
wherein:
as a result of rotating the operation tool, the linkage mechanism is folded or unfolded, and the position of the auxiliary plate is changed between the state of being housed in the bridge portion and the state of protruding from the bridge portion,
the operation tool reciprocates between one end and an other end, and the linkage mechanism is folded or unfolded as the operation tool reciprocates,
the work unit further comprises an elastic body that is connected to the bridge portion and an end region of the operation tool that is located opposite to the bridge portion,
when the operation tool reciprocates between the one end and the other end, if the operation tool is located at the one end, the elastic body biases the operation tool toward the one end, and if the operation tool is located at the other end, the elastic body biases the operation tool toward the other end.

* * * * *